(12) United States Patent
Yabe

(10) Patent No.: US 11,080,573 B2
(45) Date of Patent: Aug. 3, 2021

(54) IMAGE PROCESSING APPARATUS, CONTROL METHOD THEREOF AND STORAGE MEDIUM FOR PERFORMING THICKENING PROCESSING

(71) Applicant: CANON KABUSHIKI KAISHA, Tokyo (JP)

(72) Inventor: Takashi Yabe, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/598,123

(22) Filed: Oct. 10, 2019

(65) Prior Publication Data
US 2020/0134402 A1 Apr. 30, 2020

(30) Foreign Application Priority Data

Oct. 24, 2018 (JP) .............................. JP2018-200061

(51) Int. Cl.
*G06K 15/02* (2006.01)
(52) U.S. Cl.
CPC ....... *G06K 15/188* (2013.01); *G06K 15/1809* (2013.01); *G06K 15/1813* (2013.01)
(58) Field of Classification Search
None
See application file for complete search history.

(56) References Cited

U.S. PATENT DOCUMENTS

| | | | | |
|---|---|---|---|---|
| 6,201,551 B1* | 3/2001 | Loce | ..................... | G06T 11/203 345/442 |
| 2008/0018919 A1* | 1/2008 | Ohkawa | ................... | G06T 7/13 358/1.9 |
| 2013/0148133 A1* | 6/2013 | Kobayashi | .............. | G06T 5/003 358/1.2 |
| 2013/0155430 A1* | 6/2013 | Yabe | ....................... | G06K 15/02 358/1.9 |
| 2015/0254032 A1* | 9/2015 | Sugahara | ................. | H04N 1/40 358/1.2 |
| 2016/0266512 A1* | 9/2016 | Haruta | .................. | G03G 15/043 |
| 2017/0094115 A1* | 3/2017 | Nakano | .............. | H04N 1/40093 |
| 2017/0237876 A1* | 8/2017 | Kanai | ................ | G06K 15/1838 358/1.2 |
| 2018/0234590 A1* | 8/2018 | Haruta | ..................... | H04N 1/29 |
| 2019/0392566 A1* | 12/2019 | Nakane | ..................... | G06T 3/20 |

FOREIGN PATENT DOCUMENTS

JP 2016167777 A 9/2016

* cited by examiner

*Primary Examiner* — Dung D Tran
(74) *Attorney, Agent, or Firm* — Carter, DeLuca & Farrell LLP

(57) ABSTRACT

In processing to thicken a white thin line, the application range thereof is controlled to as to prevent a white thin line not intended by a user from being thickened. The thickening processing is performed for a line that has a density less than or equal to a predetermined density and includes a pixel having attribute information of a drawing object; and not performed for a line that has a density less than or equal to the predetermined density and includes a pixel not having attribute information of the drawing object.

20 Claims, 24 Drawing Sheets

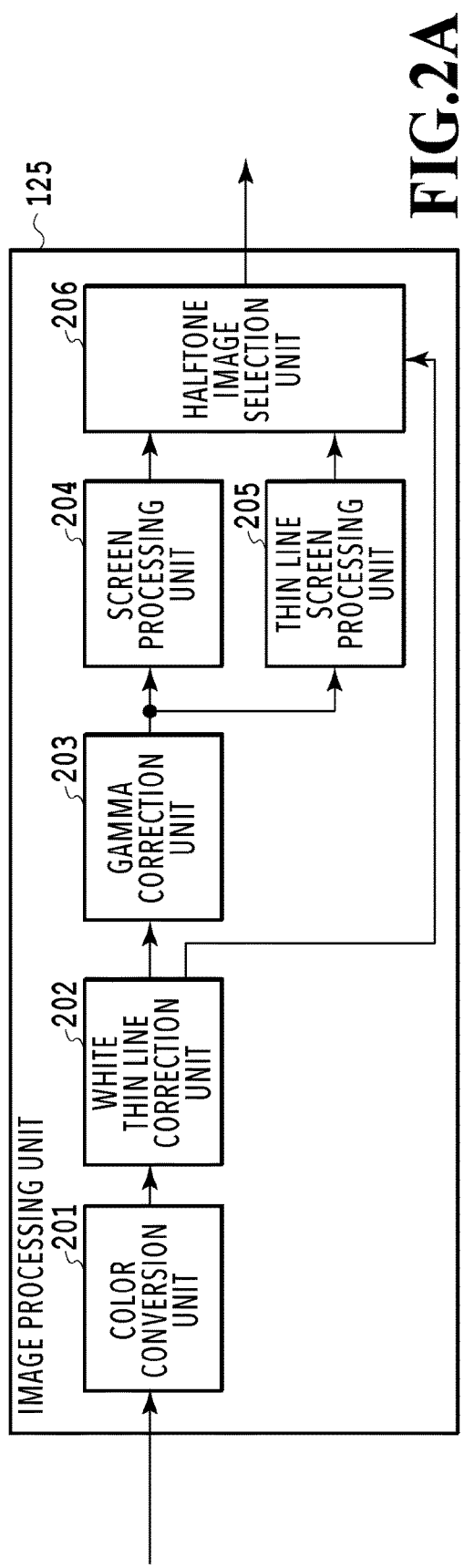
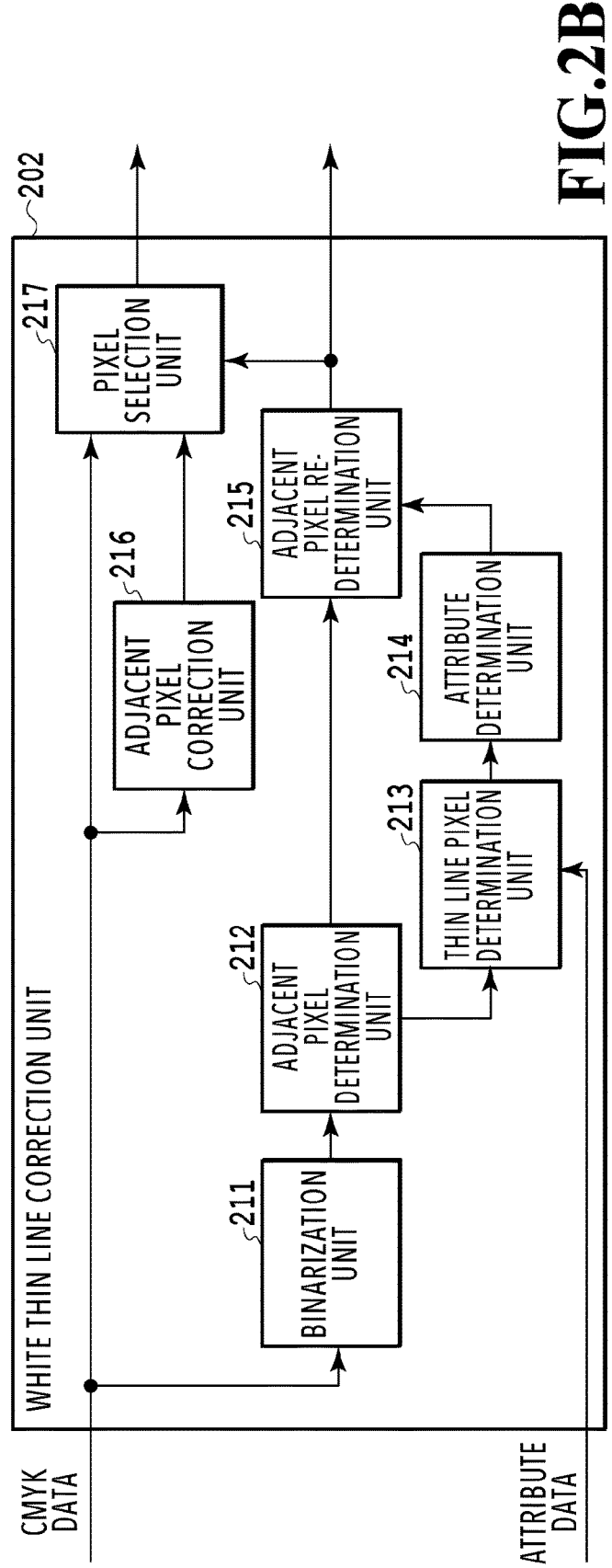

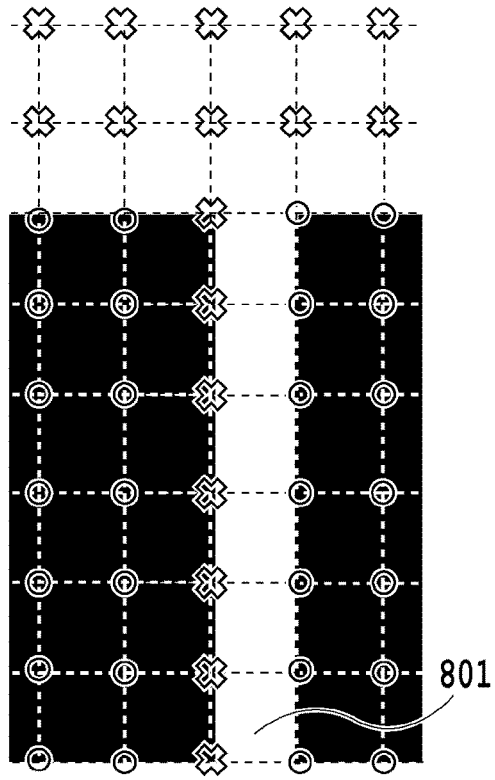
FIG.8A-1
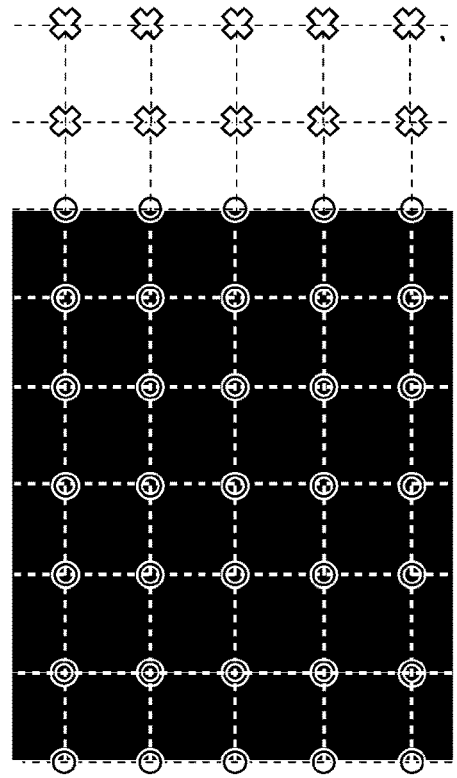
FIG.8B-1
| N | N | N | N | N | I |
|---|---|---|---|---|---|
| N | N | N | N | N | I |
| G | G | N | G | ( | |
| G | G | N | G | ( | |
| G | G | N | G | ( | |
| G | G | N | G | ( | |
| G | G | N | G | ( | |
| G | G | N | G | ( | |
FIG.8A-2
| N | N | N | N | N | I |
|---|---|---|---|---|---|
| N | N | N | N | N | I |
| G | G | G | G | G | ( |
| G | G | G | G | G | ( |
| G | G | G | G | G | ( |
| G | G | G | G | G | ( |
| G | G | G | G | G | ( |
| G | G | G | G | G | ( |
FIG.8B-2

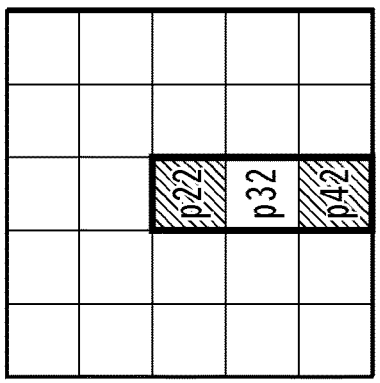
FIG.17D
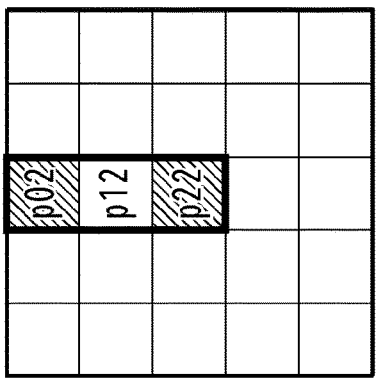
FIG.17C
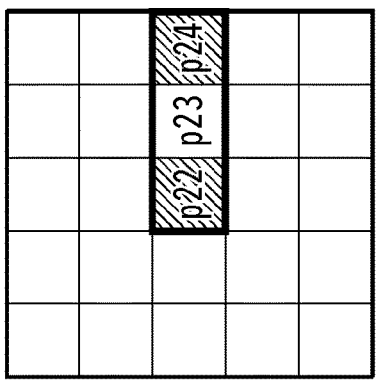
FIG.17B
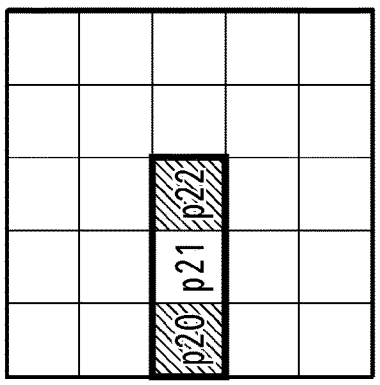
FIG.17A
| p00 | p01 | p02 | p03 | p04 |
| --- | --- | --- | --- | --- |
| p10 | p11 | p12 | p13 | p14 |
| p20 | p21 | p22 | p23 | p24 |
| p30 | p31 | p32 | p33 | p34 |
| p40 | p41 | p42 | p43 | p44 |
FIG.17E

| | | | | | | | |
|---|---|---|---|---|---|---|---|
|0|0|0|0|0|0|0|0|
|0|0|0|0|0|0|0|0|
|0|0|0|0|0|0|0|0|
|0|0|0|2|0|0|0|0|
|0|0|0|2|0|0|0|0|
|0|0|0|2|0|0|0|0|
|0|0|0|2|0|0|0|0|
|0|0|0|2|0|0|0|0|

| | | | | | | | |
|---|---|---|---|---|---|---|---|
|0|0|0|0|0|0|0|0|
|0|0|0|0|0|0|0|0|
|0|0|0|0|0|0|0|0|
|255|255|255|255|255|255|255|255|
|255|255|255|255|255|255|255|255|
|255|255|255|255|255|255|255|255|
|255|255|255|255|255|255|255|255|
|255|255|255|255|255|255|255|255|

FIG.23A-2

| | | | | | | | |
|---|---|---|---|---|---|---|---|
|0|0|0|0|0|0|0|0|
|0|0|0|0|0|0|0|0|
|0|0|0|0|0|0|0|0|
|0|0|0|0|0|0|0|0|
|0|0|0|0|0|0|0|0|
|0|0|0|0|0|0|0|0|
|0|0|0|0|0|0|0|0|
|0|0|0|0|0|0|0|0|

| | | | | | | | |
|---|---|---|---|---|---|---|---|
|0|0|0|0|0|0|0|0|
|0|0|0|0|0|0|0|0|
|0|0|0|0|0|0|0|0|
|255|255|255|255|255|255|255|255|
|255|255|255|255|255|255|255|255|
|255|255|255|255|255|255|255|255|
|255|255|255|255|255|255|255|255|
|255|255|255|255|255|255|255|255|

FIG.23B-2

| | | | | | | | |
|---|---|---|---|---|---|---|---|
|0|0|0|0|0|0|0|0|
|0|0|0|0|0|0|0|0|
|0|0|0|0|0|0|0|0|
|0|0|1|0|1|0|0|0|
|0|0|1|0|1|0|0|0|
|0|0|1|0|1|0|0|0|
|0|0|1|0|1|0|0|0|
|0|0|1|0|1|0|0|0|

| | | | | | | | |
|---|---|---|---|---|---|---|---|
|0|0|0|0|0|0|0|0|
|0|0|0|0|0|0|0|0|
|0|0|0|0|0|0|0|0|
|255|255|127|0|127|255|255|255|
|255|255|127|0|127|255|255|255|
|255|255|127|0|127|255|255|255|
|255|255|127|0|127|255|255|255|
|255|255|127|0|127|255|255|255|

FIG.23C-2

IMAGE PROCESSING APPARATUS, CONTROL METHOD THEREOF AND STORAGE MEDIUM FOR PERFORMING THICKENING PROCESSING

BACKGROUND OF THE INVENTION

Field of the Invention

The present invention relates to an image processing technique at the time of rendering of PDL data.

Description of the Related Art

In an electrophotographic printer, for example, in a case where a white thin line is formed on a black background, the portion of the thin line is a non-drawing area to which K toner, which is a color material, is not applied, and therefore, it is ideal for the K toner not to stick to the portion on a sheet. However, in fact, the K toner for forming a black background (drawing area) also sticks to the non-drawing area corresponding to the white thin line, and therefore, there is a case where the thin line disappears (that is, the thin line is no longer recognized visually). Such a phenomenon occurs also in another image forming method, for example, in an ink jet method, and in a case where a white thin line is formed on a black background, the K ink blurs and spreads up to the non-drawing area corresponding to the white thin line and the thin line may disappear.

As described above, in a case where a white thin line is formed by not applying a color material in a printer that forms an image on a printing apparatus by using a color material, encroachment of the color material applied to the drawing area into the non-drawing area occurs. As a result of this, such a phenomenon called "thin line disappearance" may occur in which the portion of the white thin line becomes narrower than supposed or the thin line itself disappears. As a measure against the "thin line disappearance", a technique is known conventionally that highlights, in a case where a white thin line is included in printing-target image data, the white thin line portion. For example, Japanese Patent Laid-Open No. 2016-167777 has disclosed a method of improving the visibility of a white thin line by widening the non-drawing area to which toner is not applied by detecting a white thin line within the printing-target image and performing processing to increase the width of the detected thin line.

The above-described conventional processing to thicken a white thin line has such a problem that the processing is applied uniformly to all the white thin lines existing within the printing-target image, and therefore, for example, even the portion of a white thin line for which drawing is not intended by user is also thickened. In a case where the thickening processing is applied also to a white thin line not intended by a user as described above and the white thin line becomes conspicuous, the thickening processing whose original purpose is to improve print quality functions to worsen the print quality on the contrary.

SUMMARY OF THE INVENTION

In the technique according to the present disclosure, for a line having a density less than or equal to a predetermined density in image data including one or a plurality of objects, thickening processing is performed for a line that has a density less than or equal to a predetermined density and includes a pixel having attribute information of a drawing object; and not performed for a line that has a density less than or equal to the predetermined density and includes a pixel not having attribute information of the drawing object.

Further features of the present invention will become apparent from the following description of exemplary embodiments with reference to the attached drawings.

BRIEF DESCRIPTION OF THE DRAWINGS

FIG. 2A is a block diagram showing an example of an internal configuration of an image processing unit comprised by a printer and FIG. 2B is a detailed block diagram showing an internal configuration of a white line correction unit according to a first embodiment;

FIG. 8A-1 and FIG. 8B-1 are each a diagram showing an example of image data after rendering in accordance with physical coordinates and FIG. 8A-2 and FIG. 8B-2 are each a diagram showing an example of attribute data corresponding thereto;

FIG. 15A-1 to FIG. 15C-1 are each a diagram showing an example of BMP data of a K plane and FIG. 15A-2 to FIG. 15C-2 are each a diagram showing an example of attribute data thereof;

FIG. 16A-1 to FIG. 16C-1 are each a diagram showing an example of a binary image and FIG. 16A-2 to FIG. 16C-2 are each a diagram showing an example of attribute data thereof;

FIG. 17A to FIG. 17D are each a diagram showing an example of a pattern in matching processing and FIG. 17E is a diagram showing a pixel position of each pixel within a window image;

FIG. 18A-1 to FIG. 18C-1 are each a diagram showing an example of a thin line adjacency flag after re-determination processing and FIG. 18A-2 to FIG. 18C-2 are each a diagram showing an example of a pixel value selected in accordance with the thin line adjacency flag;

FIG. 23A-1 to FIG. 23C-1 are each a diagram showing an example of an integrated flag after flag integration processing and FIG. 23A-2 to FIG. 23C-2 are each a diagram showing an example of a pixel value selected in accordance with the integrated flag.

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment (System Configuration)

Figure 1:
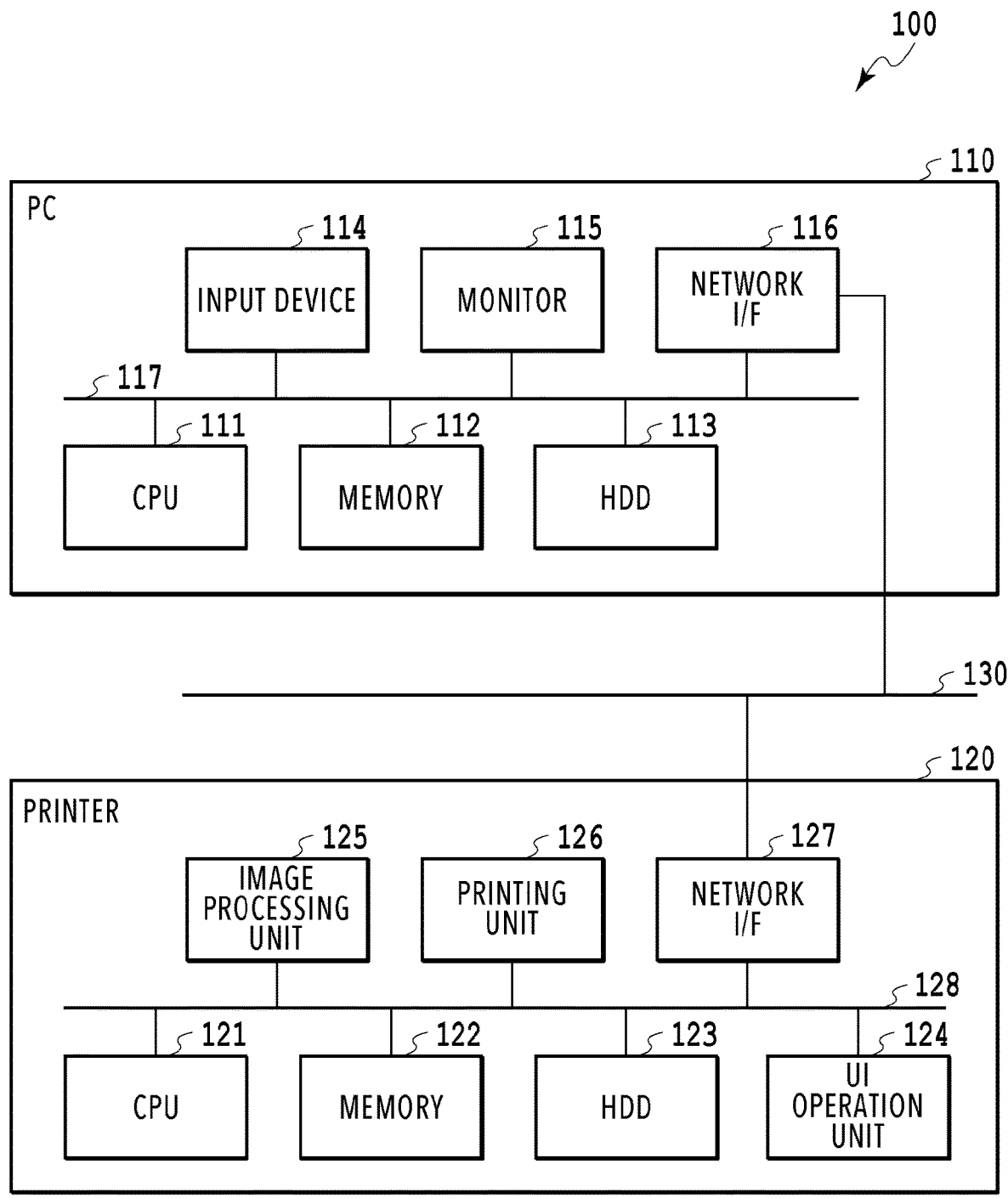
FIG. 1 is a block diagram showing an example of a configuration of a printing system.

FIG. 1 is a block diagram showing an example of a configuration of a printing system according to the present embodiment. A printing system 100 shown in FIG. 1 includes a PC 110 as a client terminal and a printer 120 as an image forming apparatus and both are connected to each other by a network 130, such as a LAN.

The PC 110 includes a CPU 111, a memory 112, an HDD 113, an input device 114, a monitor 115, and a network I/F 116. The CPU 111 is a computing device that governs control of the entire PC 110. The network I/F 116 is an interface for performing transmission and reception of various kinds of data with another device (not shown schematically) on the network 130, including the printer 120 via the network 130. The memory 112 includes a RAM as a work area of the CPU 111 and a ROM for storing various programs. The HDD 113 is a large-capacity storage device used to store the OS, programs, various kinds of data processed by applications, and the like and may be an SSD or a flash memory. The input device 114 is a keyboard, a mouse, and the like for a user to give instructions to perform various operations. The monitor 115 is a display device for displaying various displays to a user. Then, each of the above-described elements is connected to one another via a bus 117. In the PC 110, a printer driver compatible with the printer 120 is installed. The printer driver performs processing to convert data created or the like on various applications by a user (hereinafter, described as "application data") into PDL data for printing by the printer 120. The PDL data created by the printer driver is sent to the printer 120.

The print 120 includes a CPU 121, a memory 122, an HDD 123, a UI operation unit 124, an image processing unit 125, a printing unit 126, and a network I/F 127. The CPU 121 is a computing device that governs control of the entire printer 120. The CPU 121 interprets PDL data received from the PC 110 and performs rendering to generate multi-valued image data in the bitmap format (hereinafter, described as "BMP data"). In the present embodiment, the configuration is such that rendering is implemented by software, but it may also be possible to implement rendering by hardware. Each pixel in the multi-valued image data obtained by rendering is represented by a grayscale or a plurality of color components, such as RGB (red, green, blue) and has, for example, an 8-bit value (256 tones) for each color component. Further, in rendering, in addition to BMP data, data indicating the object attribute (hereinafter, called "attribute data") of each pixel configuring the BMP data is also generated. This attribute data is information indicating which kind of drawing object each pixel belongs to. As the kinds of drawing object, there are Text (text), Line (line), Graphic (graphic), Image (photo), and the like. Then, the area that does not belong to any drawing object within a page (area without drawing object) is the non-drawing area and handled as a background. For example, there is a case where the background that is seen between a first drawing object (rectangular) and a second drawing object (rectangular) adjacent to each other forms a line. In the present embodiment, an object in the non-drawing area, which occurs between a plurality of drawing objects, is called a non-drawing object. For one of other examples, the non-drawing object may not have any attribute indicating the type of the object. In other words, an object having no attribute indicating the type of the object may be determined as the non-drawing object. The attribute data holds a value corresponding to each type of object including the non-drawing object. The value corresponding to the non-drawing object is, for example, an attribute value indicating a background attribute indicative of a background. The network I/F 126 is an interface for performing transmission and reception of various kinds of data with another device (not shown schematically) on the network 130, including the PC 110 via the network 130. The memory 122 includes a RAM as a work area of the CPU 121 and a ROM for storing various programs. The HDD 123 is a large-capacity storage device used to store the OS, programs, PDL data received from the PC 110, and the like and may be an SSD or a flash memory. The UI operation unit 124 is, for example, a touch panel display and receives the display of various kinds of information and the input operation of a user. Further, the UI operation unit 124 may include a ten-key and buttons. The image processing unit 125 generates halftone image data (print data) that is supplied to the printing processing in the printing unit 126 by performing various kinds of image processing for the multi-valued image data. Details of the image processing unit 125 will be described later. The printing unit 126 performs printing and outputting for a printing medium, such as paper, by using the print data generated by the image processing unit 125. Then, each of the above-described elements is connected to one another via a bus 128. The software that implements various operations and various kinds of processing in the printer 120 is stored in, for example, the HDD 123 described above and the various operations and the various kinds of processing are implemented by the software being loaded onto the RAM and being executed by the CPU 121.

(Details of Image Processing Unit)

FIG. 2A is a block diagram showing an example of the internal configuration of the image processing unit 125 comprised by the printer 100. The image processing unit 125 has a color conversion unit 201, a white thin line correction unit 202, a gamma correction unit 203, a screen processing unit 204, a thin line screen processing unit 205, and a halftone image selection unit 206. To the image processing unit 125, the BMP data obtained by rendering and the attribute data corresponding to each pixel thereof are input.

The color conversion unit 201 performs color conversion processing to convert the grayscale or the color components of RGB of the input BMP data into color components of CMYK (cyan, magenta, yellow, black). The BMP data after the color conversion having each color component of CMYK is called "CMYK data" hereinafter. The CMYK data obtained by the color conversion processing is stored in a buffer, not shown schematically. In a case where PDL data that handles the CMYK color space, such as PS (Post Script) and PDF (Portable Document Format), is input, the multi-valued image data after rendering has the color components of CMYK, and therefore, the color conversion processing by the color conversion unit 201 is not performed. In this case, the CMYK data input to the image processing unit 125 is input directly to the white thin line correction unit 202.

The white thin line correction unit 202 performs thickening processing to increase the apparent width for a thin line (hereinafter, called "white thin line") whose density value is "0" or having an extremely low density value equivalent thereto, which is included in each color plane of the CMYK data. The area whose density value is "0" or having an extremely low density value equivalent thereto is a so-called extreme highlight area. The white thin line is, for example, a thin line as a gap that occurs between a plurality of drawing objects.

Figure 3A:
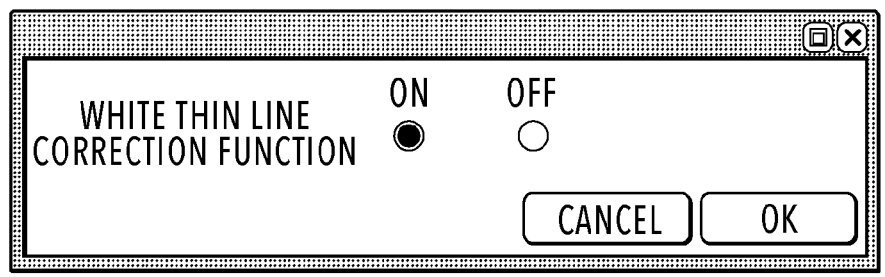
FIG. 3A is a diagram showing an example of a setting UI screen of thickening processing and FIG. 3B is a diagram showing an example of a setting UI screen of a line width adjustment function.

Specifically, in the thickening processing, CMYK data is acquired from a buffer, not shown schematically, and a white thin line in each color plane is detected. Then, for the pixel adjacent to the detected white thin line, correction processing to reduce the density value thereof is performed. For example, in a case where a white thin line is detected in the K plane, the density value of the pixel belonging to the area adjacent to the white thin line (that is, the black area) is put close to "0". Due to this, it is possible to thicken the white thin line within the printing target-image. Further, the white thin line correction unit 202 outputs flag information for switching screen processing to be applied between the pixels configuring the white thin line and the other pixels to the halftone image selection unit 206. The screen processing refers to processing to generate halftone image data represented by dots by turning CMYK data that is input into N-valued data by using a predetermined dither matrix. By applying flat screen processing to the pixels configuring a thin line, it is possible to reduce discontinuity and jaggies of an object. As described previously, the thickening processing is performed as a measure against the "thin line disappearance" phenomenon, but there is a case where the white thin line portion dose not disappear under a condition, for example, such as that the density of the background area is low. Consequently, for example, it may also be possible to design a configuration in which it is possible for a user to set the thickening processing valid/invalid in accordance with the situation via the UI screen as shown in FIG. 3A. FIG. 2B is a detailed block diagram showing the internal configuration of the white thin line correction unit 202 according to the present embodiment. The white thin line correction unit 202 includes a binarization unit 211, an adjacent pixel determination unit 212, a thin line pixel determination unit 213, an attribute determination unit 214, an adjacent pixel re-determination unit 215, an adjacent pixel correction unit 216, and a pixel selection unit 217. Details of the thickening processing in the white thin line correction unit 202, including the functions and the like of each processing unit shown in FIG. 2B, will be described later. CMYK data after the thickening processing is input to the gamma correction unit 203.

The gamma correction unit 203 performs gamma correction processing to correct the pixel value in the CMYK data after the thickening processing by using a one-dimensional lookup table (LUT) so that the density characteristic at the time of the toner image being transferred onto a sheet is a desired density characteristic. It is sufficient to select the one-dimensional LUT to be used appropriately in accordance with the change in the state of the printing unit 126 by, for example, preparing in advance a plurality of one-dimensional LUTs having the liner conversion characteristic in which the input value is the output value as it is. Alternatively, it may also be possible for the CPU 121 to appropriately perform rewriting of the one-dimensional LUT. The CMYK data after the gamma correction is input to the screen processing unit 204 and the thin line screen processing unit 205.

The screen processing unit 204 performs concentrated screen processing for the CMYK data after gamma correction for each color plane of CMYK. Further, the thin line screen processing unit 205 performs flat screen processing as the thin line screen processing for the CMYK data after gamma correction for each color plane of CMYK. The results of both pieces of screen processing (halftone image data obtained for each color plane of CMYK) are also input to the halftone image selection unit 206.

The halftone image selection unit 206 selects one of the halftone image data generated by the screen processing unit 204 and the halftone image data generated by the thin line screen processing unit 205 in units of pixels in accordance with the flag information described above and outputs to the printing unit 126 as print data.

(Flow Up to Rendering)

Figure 4:
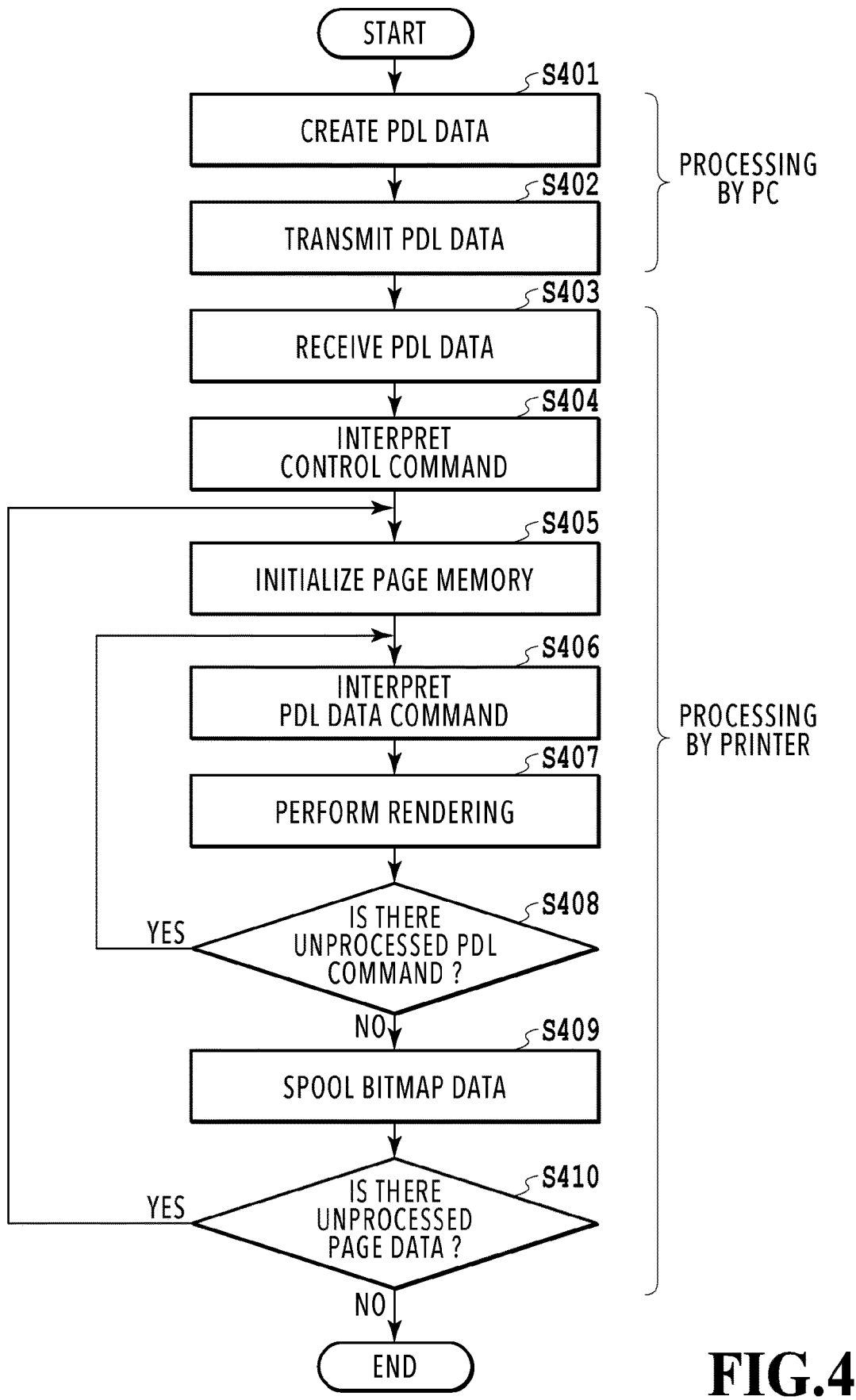
FIG. 4 is a flowchart showing a flow of processing in the printing system.

Next, a flow of processing from creation of PDL data up to rendering in the printing system 100 is explained. FIG. 4 is a flowchart showing a flow of processing in the printing system 100. Of each step shown in the flow in FIGS. 4, S401 and S402 are processing in the PC 110 and S403 to S410 are processing in the printer 120.

At S401, in the PC 110, based on printing instructions of a user, PDL data is created from application data. At this time, the printer driver also creates a command (printer control command) for controlling the operation of the printer 120 and includes the command in the PDL data. For example, a command that specifies ON/OFF of the white thin line correction function (thickening processing) described previously, a command that specifies ON/OFF of a line width adjustment function, to be described later, or the like is included as a printer control command.

At S402, the PDL data created at S401 is transmitted to the printer 120 via the network I/F 116.

At S403, the PDL data transmitted from the PC 110 is received by the printer 120. At S404 that follows, the printer control command within the received PDL data is interpreted and the operation setting in accordance with the command is performed. For example, in a case where a printer control command that specifies ON of the white thin line correction is included, the operation setting of the image processing unit 125 is performed by the CPU 121 so that the thickening processing is performed in the white thin line correction unit 202.

At S405, as the preparation processing of rendering, initialization processing of a Page memory is performed. The Page memory is a storage area storing multi-valued image data in the bitmap format (hereinafter, described as "BMP data") corresponding to one page. At S406 that follows, processing to interpret the PDL commands in the page data of interest within the received PDL data one by one and convert the PDL command into a rendering command is performed. Then, at S407, by using the rendering command obtained at S406, rendering for the page data of interest is performed. The device-dependent BMP data in units of pages obtained by the rendering is stored in the Page memory described above. At this time, the attribute data indicating the attribute of each pixel in the BMP data corresponding to one page is also generated and stored. Details of rendering will be described later.

At S408, whether or not there is an unprocessed PDL command in the page data of interest is determined. In a case where an unprocessed PDL command exists within the page data of interest, the processing returns to S406, and the next PDL command is interpreted and rendering is performed. On the other hand, in a case where all the PDL commands within the page data of interest are processed, the processing advance to S409. At S409, the BMP data corresponding to one page stored in the Page memory is spooled (stored) in the HDD 123.

At S410, whether or not there is unprocessed page data within the PDL data received at S403 is determined. In a case where unprocessed page data exists, the processing returns to S405 and the processing for the next page data is continued. On the other hand, in a case where all the page data is processed (in a case where BMP data of all the pages of the received PDL data is generated and spooled in the HDD 123), this processing is terminated.

The above is a rough flow of the processing in the printing system 100.

(Review of Problem of the Present Invention)

Here, the problem of the present invention, which arises at the time of rendering at S407 described above, that is, a case where a white thin line not intended by a user occurs is reviewed. The case where a white thin line not intended by a user occurs is roughly divided into two cases as follows.

Figure 5A:
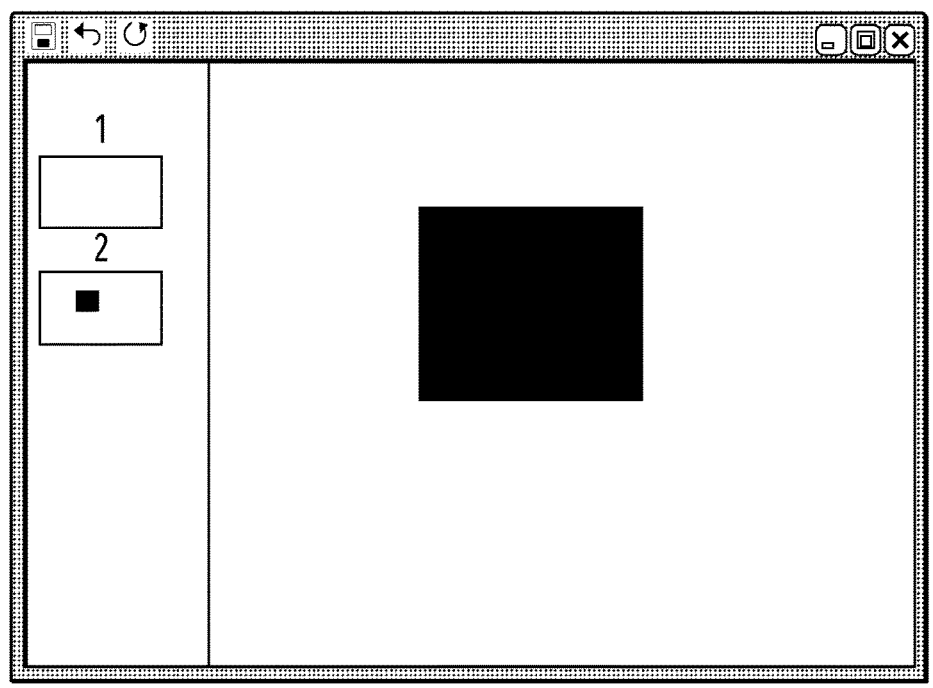
FIG. 5A and FIG. 5B are each a diagram showing an example of an application screen.
Figure 5B:
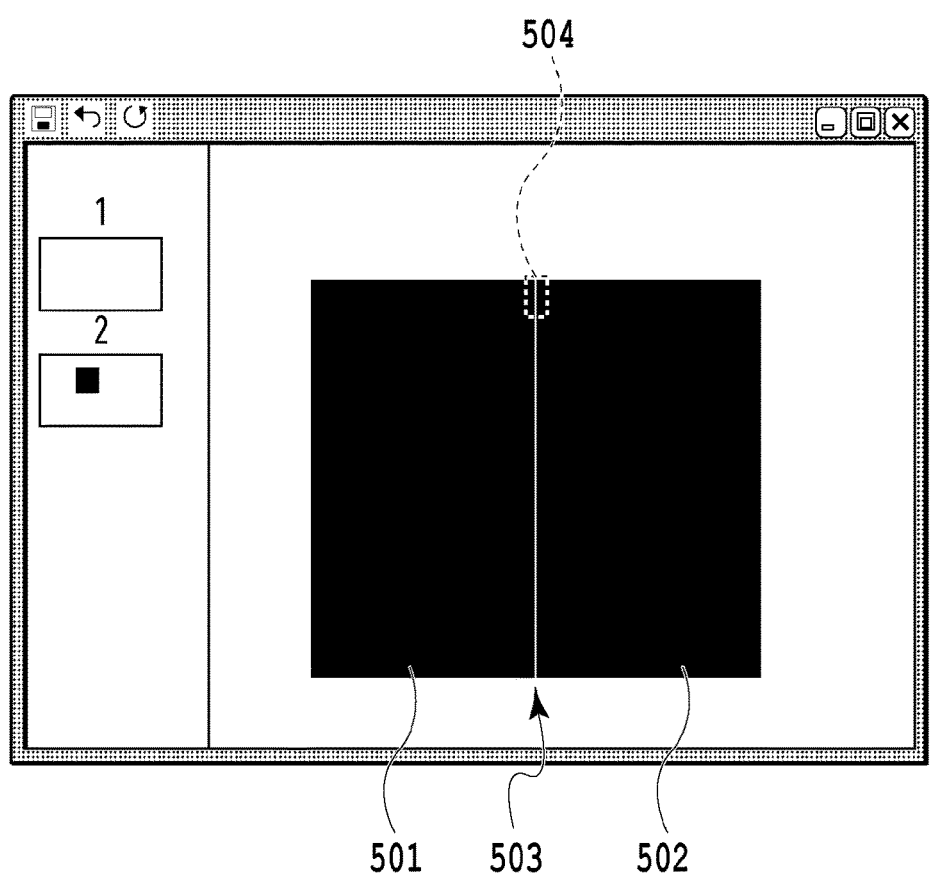

The first case is a case where a white thin line occurs resulting from a fill-rule of PDL. This case is a case where it is supposed that a plurality of drawing objects is arranged with no gap in between on the application, but in fact, there is a very small gap and the gap widens to a large gap in the BMP data after rendering. FIG. 5A and FIG. 5B are each a diagram showing an example of a certain application screen that is displayed on the monitor 115 of the PC 110. FIG. 5A show a state of a display magnification of 100% in a case where two black rectangular objects 501 and 502 are arranged side by side. Then, FIG. 5B shows a state where the display magnification in FIG. 5A is changed from 100% to 200%. From a comparison between both screens, it is known that a white thin line (gap) 503 that is not recognized in FIG. 5A exists in FIG. 5B after the magnification is changed. In PDL data described in a language for printer control, called a page description language, an object drawing command (hereinafter, described as "PDL command") is represented by theoretical coordinates on the application. The printer 120 performs printing processing by using image data in the bitmap format obtained by interpreting the input PDL command and converting the theoretical coordinates on the application into device-dependent physical coordinates (corresponding to a pixel for printing). At the time of conversion from theoretical coordinates into physical coordinates, in a case where the fill-rule in accordance with the PDL type is observed, the width of the gap increases to a one-pixel width at the maximum (42 μm in a case of 600 dpi) because of the conversion error, and therefore, there is a case where a white thin line that occurs unintentionally becomes more conspicuous. As the PDL type that causes such a phenomenon, mentions is made of, for example, LIPS (UFR), PCL, and the like. Conversion from theoretical coordinates into physical coordinates in accordance with the fill-rule of PDL will be described later by using FIG. 7A, FIG. 7B, FIG. 8(A-1), FIG. 8(A-2), FIG. 8(B-1), and FIG. 8(B-2).

The second case is a case where a gap occurs unintentionally as a result of using the function to perform correction so that the thickness becomes close to the original one for PDL in which the line is reproduced somewhat thicker at the time of drawing a thin line, represented by PS (Post Script) and PDF (Portable Document Format). According to the fill-rule of PS or PDF, the pixel that overlaps the drawing area even a little is the target of fill. As a result of this, a thin line is reproduced thicker than a predetermined width. Because of this, the line width adjustment function called "Stroke Adjust" that performs correction so that the line width is returned to the original one is provided. There is a case where a gap (white thin line having a one-pixel width) not intended by a user occurs because the area to be filled is reduced by the line width adjustment function.

The present invention controls the application range of the thin line thickening processing so as to prevent a gap (white thin line) that occurs unintentionally from widening in either case. Before explanation of control of the thickening processing according to the present invention, each case where a white thin line occurs on the contrary to the intention of a user is explained in more detail by using a specific example.

<White Thin Line that Occurs Resulting from Fill-Rule of PDL>

Figure 6:
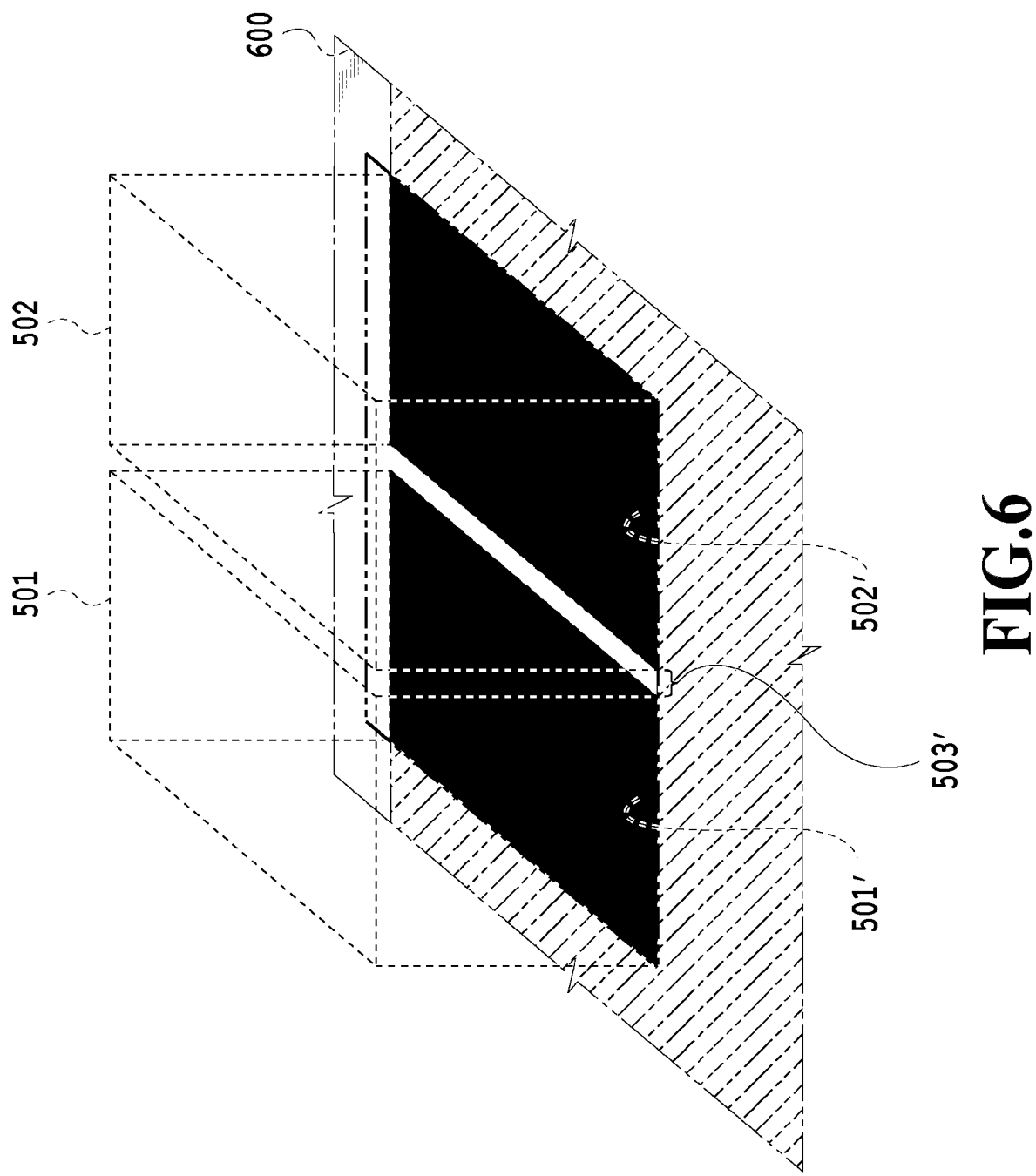
FIG. 6 is an enlarged diagram of an area on a sheet, which corresponds to a range enclosed by a broken-line frame in FIG. 5B.
Figure 7B:
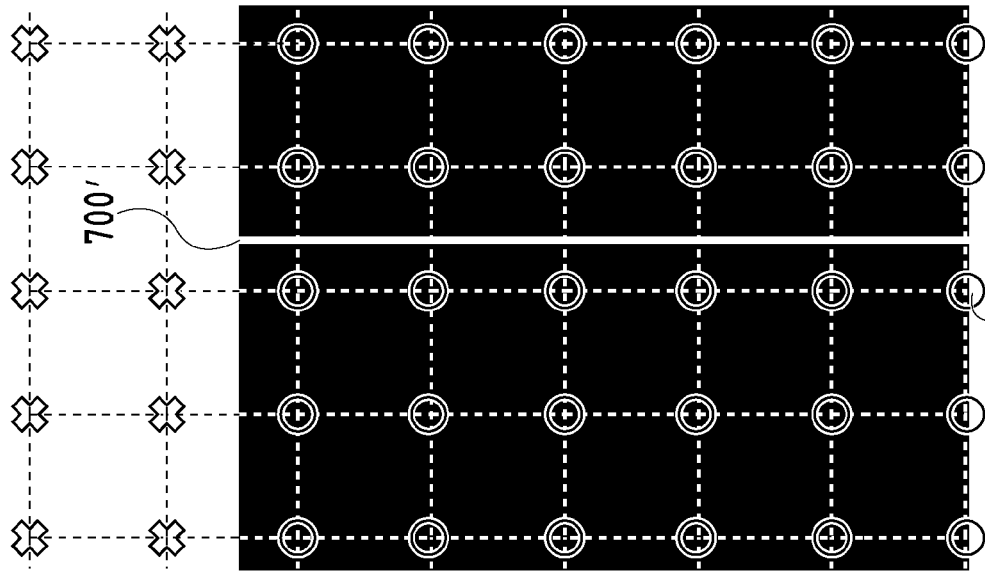
FIG. 7A and FIG. 7B are each a diagram showing results of drawing PDL data by slightly shifting the positions of theoretical coordinates with physical coordinates being overlapped.
Figure 7A:
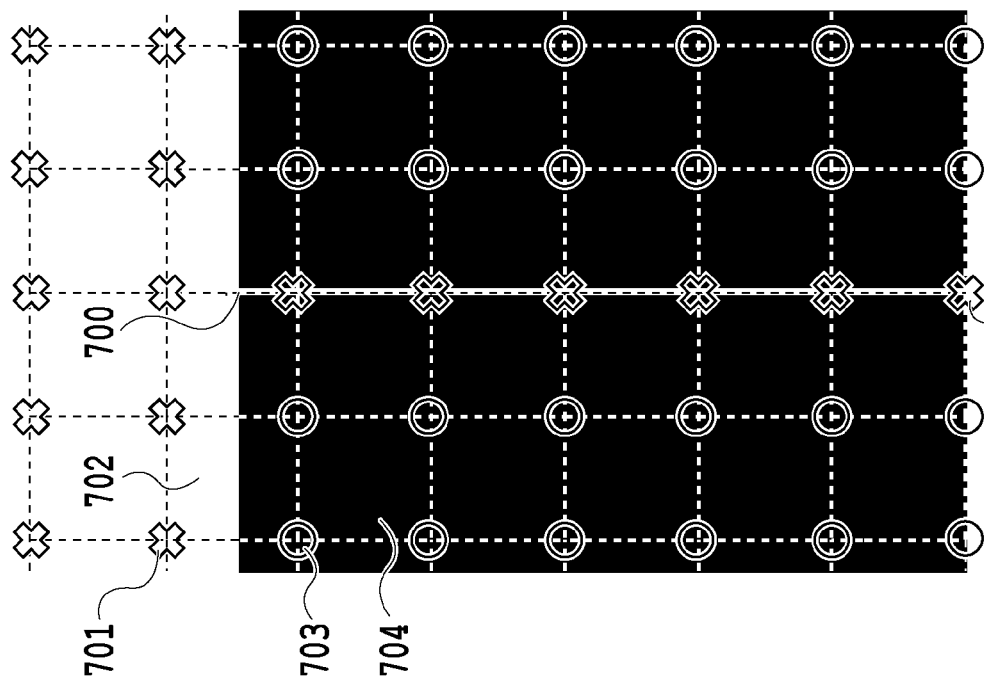

Here, explanation is given on the assumption that PDL data specifying a drawing of the two black rectangular objects shown in FIG. 5A and FIG. 5B described previously is input to the printer 120. FIG. 6 is an enlarged diagram of an area on a sheet 600, which corresponds to the range enclosed by a broken-line frame 504 in FIG. 5B. In this case, a portion 501' to be painted black of the black rectangular object 501 on one side and a portion 502' to be painted black of the black rectangular object 502 on the other side are drawn side by side on the sheet 600 and a white thin line 503' is formed. Here, it is assumed that the width of the white thin line 503' is less than one pixel. As described above, the printer 120 interprets the PDL data and converts the theoretical coordinates on the application into the device-dependent physical coordinates. FIG. 7A and FIG. 7B are each a diagram showing the results of drawing the above-described PDL data with physical coordinates being overlapped, corresponding to the range enclosed by the broken-line frame 504 in FIG. 5B. Both in FIG. 7A and in FIG. 7B, the minimum unit square enclosed by a dotted line represents one pixel in the physical coordinates. In FIG. 7A, a gap 700 corresponding to the white thin line 503 described above exists on a dotted line representing a pixel boundary in the physical coordinates. On the other hand, in FIG. 7B, a gap 700' corresponding to the white thin line 503 described above exists between two parallel dotted lines each representing a pixel boundary. As described above, in a case where the theoretical coordinates are different even a little, the position in the physical coordinates after conversion may be different. For example, according to the GDI fill-rule, in a case where the intersection of dotted lines perpendicular to each other is included in the area (here, black rectangular area) specified to be painted by the PDL data, the one pixel in the downward to the right direction, in which the intersection is included, is painted with a fill value thereof. In other words, in a case where the top-left vertex of one pixel in the physical coordinates is included in an area specified to be painted by the PDL data, processing to paint the pixel is performed. For example, an intersection 701 in FIG. 7A is not included in the black rectangular area specified to be painted, and therefore, a pixel 702 in the downward to the right direction is not painted. On the other hand, an intersection 703 directly under the intersection 701 is included in the black rectangular area specified to be painted, and therefore, a pixel 704 in the downward to the right direction is painted with a fill value (for example, 255) specified in the PDL data. Based on the above fill-rule, in FIG. 7A and FIG. 7B, a x mark is attached to the intersection not included in the black rectangular area specified to be painted and a ○ mark is attached to the intersection included therein. In FIG. 7A, the gap 700 exists on the dotted line and all the intersections aligned vertically including an intersection 705 located on the dotted line are not included in the black rectangular area specified to be painted in the PDL data, and therefore, the x mark is attached thereto. On the other hand, in FIG. 7B, the gap 700' does not exist on the dotted line and an intersection 705' corresponding to the intersection 705 described above is also included in the black rectangular area specified to be painted in the PDL data, and therefore, the ○ mark is attached. FIG. 8A-1 and FIG. 8B-1 each show image data after rendering in accordance with the physical coordinates, corresponding to FIG. 7A and FIG. 7B described above, respectively. Both are the results of performing processing to paint black the pixel at the intersection to which the ○ mark is attached and not to paint the pixel at the intersection to which the x mark is attached. Then, FIG. 8A-2 and FIG. 8B-2 are each attribute data that is generated simultaneously at the time of rendering and FIG. 8A-2 corresponds to FIG. 8A-1 and FIG. 8B-2 corresponds to FIG. 8B-1. The meaning of the alphabet in FIG. 8A-2 and FIG. 8B-2 is that N=non-drawing object (background) and G=graphic object. Here, for explanation, the attribute data is described by the alphabet, but the actual attribute data is described by a numerical value and stored, for example, such as N is represented by "0" and G by "1". As described previously, in the PDL data, the two black rectangular objects 501 and 502 are arranged side by side and between the two objects, there is a very small gap whose width is less than one pixel. However, in the rendering results in FIG. 8A-1, the width of the gap has increased up to about a one-pixel width, which is the device minimum resolution. On the other hand, in the rendering results in FIG. 8B-1, the gap has disappeared. As described above, there is a case where a difference arises in the rendering results resulting from a slight difference in the theoretical coordinates, but it is desirable that the same rendering results be obtained originally for the same PDL data.

In the above-described example, the case where the GDI fill-rule is observed is explained as an example, but this is not limited. For example, PDL of the kind of PCL has the following fill-rule. That is, in a case where the center of one pixel in the physical coordinates is included in the area specified to be painted, the pixel is painted. Here, the center of a pixel is the intersection of diagonal lines. In the example in FIG. 7A or FIG. 7B, according to the PCL fill-rule, in a case where the intersection of the diagonal lines of the square represented by the dotted line is included in the black rectangular area, the square is painted. Also in a case where the PCL fill-rule such as this is applied, as in the case where the GDI fill-rule is applied, there is such a problem that a small gap whose width is less than one pixel is widened so as to have a one-pixel width.

Figure 9:
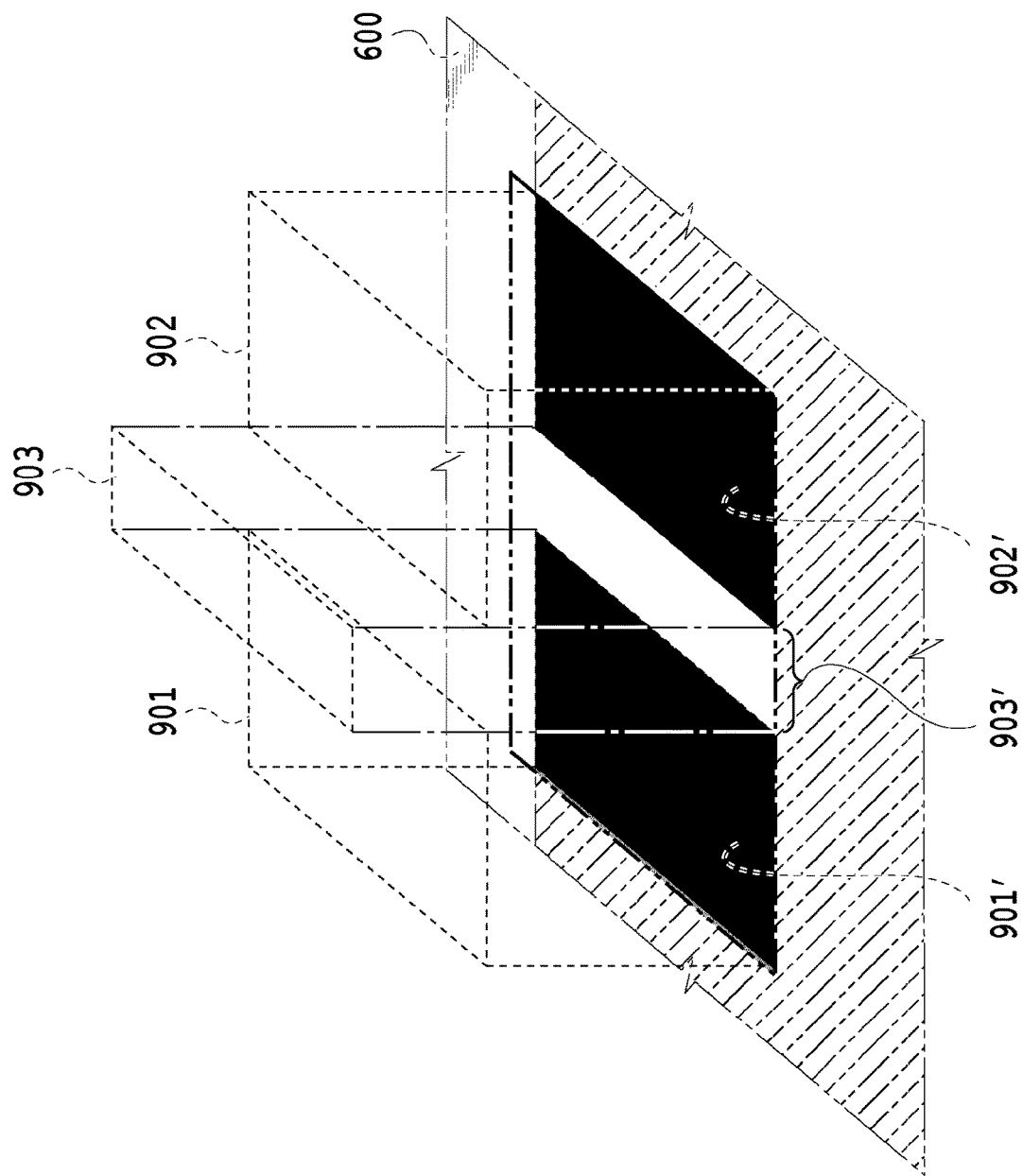
FIG. 9 is an enlarged diagram of a portion at which two black rectangular objects on a sheet are adjacent to each other.
Figure 10:
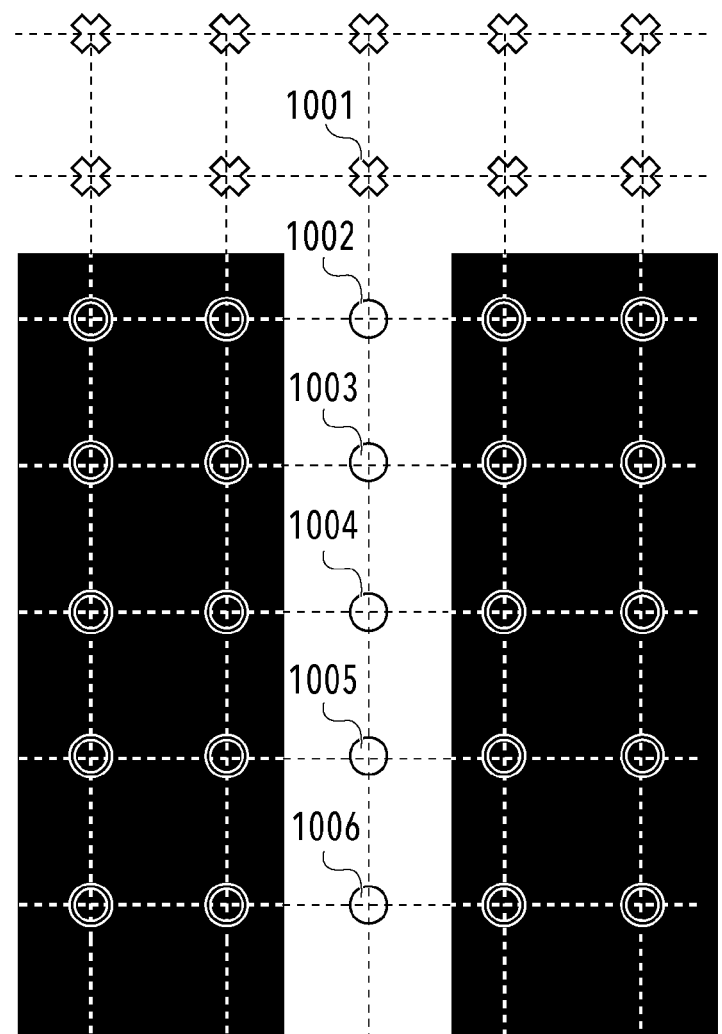
FIG. 10 is a diagram showing results of drawing PDL data in theoretical coordinates of an application with physical coordinates being overlapped.

Next, a case is considered where PDL data is input to the printer 120, in which two black rectangular objects are arranged side by side with an interval corresponding to one pixel being in between within a page and further, a while line object having a one-pixel width is arranged so as to fill the gap portion. FIG. 9 is the drawing results in accordance with the PDL data and is an enlarged diagram of a portion where the two black rectangular objects on the sheet 600 are adjacent to each other. In this case, a portion 901' to be painted black of a black rectangular object 901 on one side and a portion 902' to be painted black of a black rectangular object 902 on the other side are drawn side by side and further, a portion 903' to be painted white of a line object 903 is drawn on the adjacent portion in an overwriting manner. FIG. 10 is a diagram showing the results of drawing the above-described PDL data in the theoretical coordinates of the application with physical coordinates being overlapped and the minimum unit square enclosed by a dotted line represents one pixel in the physical coordinates. Hereinafter, differences from the case in FIG. 6, that is, different points resulting from the difference in PDL data are explained.

Figure 11B:
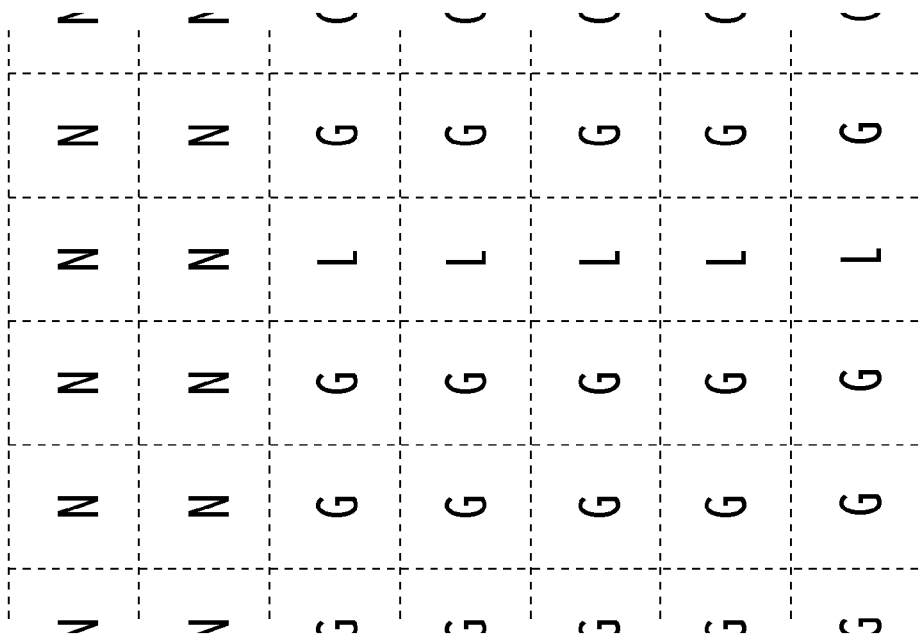
FIG. 11A is a diagram showing an example of image data after rendering in accordance with physical coordinates and FIG. 11B is a diagram showing an example of attribute data corresponding thereto.
Figure 11A:
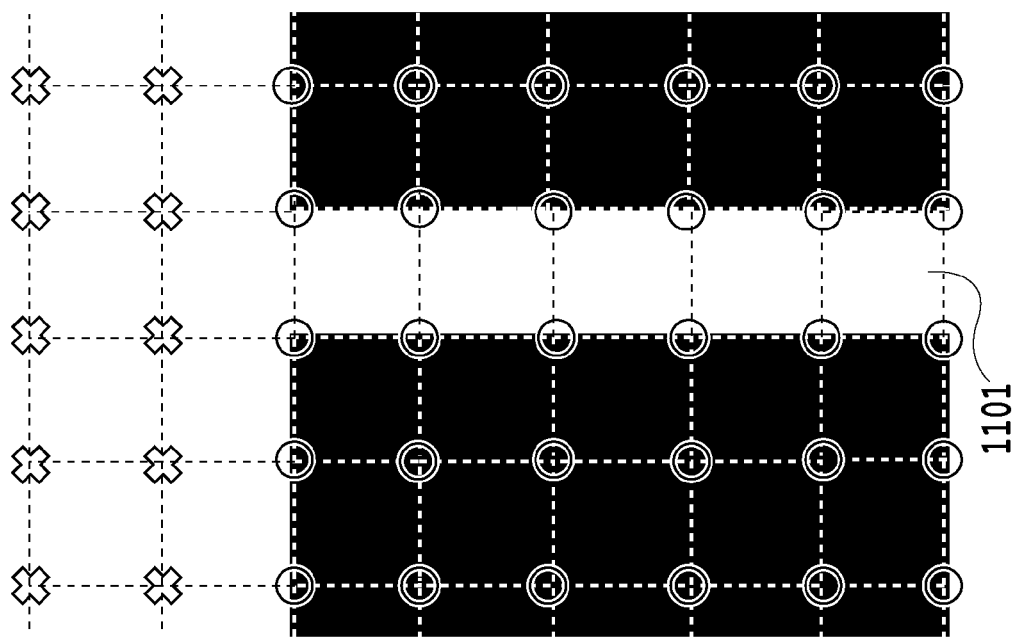

First, the two black rectangular objects are drawn and this is the same as in the case in FIG. 6. A difference lies in that the portion 903' to be painted white of the line object 903 is further drawn in an overwriting manner. At this time, as to the white line object 903, in FIG. 10, in accordance with the GDI fill-rule described above, intersections 1002 to 1006 are included in the white line object drawing area specified to be painted, and therefore, the ○ mark is attached thereto. FIG. 11A shows image data after rendering in accordance with the physical coordinates and the results of performing processing to paint black the pixel corresponding to the intersection to which the ○ mark is attached and not to paint the pixel corresponding to the intersection to which the x mark is attached. Then, FIG. 11B shows the attribute data that is generated simultaneously at the time of rendering. The meaning of the alphabet in FIG. 11B is that N=non-drawing object, G=graphic object, and L=line object. Here, for explanation, the attribute data is described by the alphabet, but the actual attribute data is described by a numerical value and stored, for example, such as N is represented by "0", G by "1", and L by "2". Here, a comparison between FIG. 11A and FIG. 8A-1 described previously indicates that the both pieces of image data are the same contents. However, in a case where attention is focused on the attribute data, FIG. 11B differs from FIG. 8B-1 in the attribute of the portion corresponding to the white thin line. That is, a white pixel group 801 in FIG. 8A-1 is the area of the non-drawing object, but a white pixel group 1101 in FIG. 11A is the area of the drawing object of the Line attribute. As described above, even for the portion that is reproduced as the white thin line in the same manner by the image data after rendering, there are a case where the thin line is the non-drawing object (area in which no drawing object exists) and a case where the thin line is the white line object (area in which the drawing object exists). Then, in the former case, the white line is not intended by a user, and therefore, it is desirable not to apply the thickening processing.

<White Thin Line that Occurs in Case where PDL Type is PS or PDF>

Figure 12:
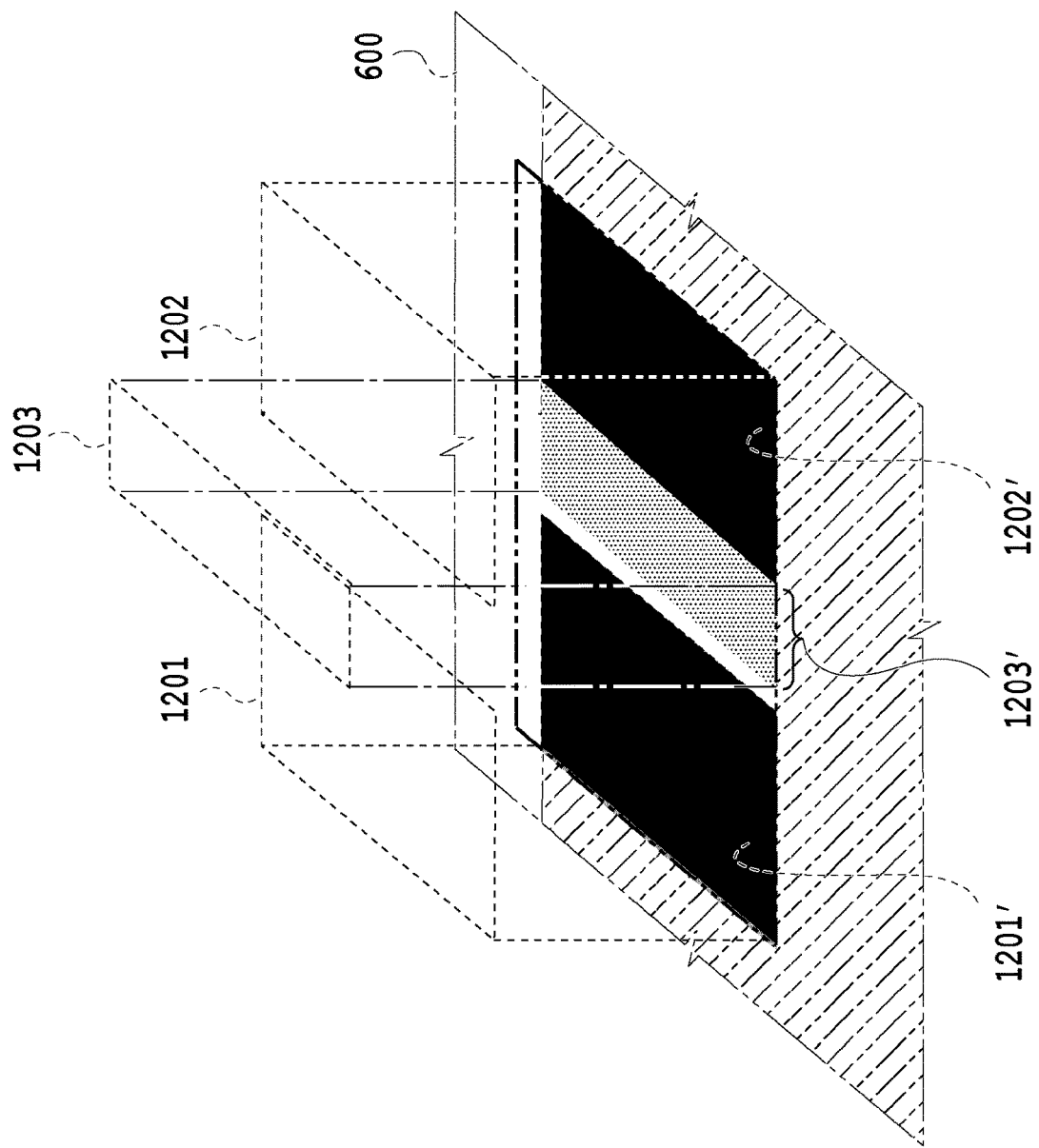
FIG. 12 is an enlarged diagram of a portion at which two black rectangular objects on a sheet are adjacent to each other.

A case is considered where PDL data is input to the printer 120, in which two black rectangular objects are arranged side by side with an interval corresponding to one pixel being in between within a page as in the case in FIG. 9 described previously and further, a white line object of the Line attribute having a one-pixel width is arranged and drawn so as to fill the gap portion. However, this case differs from the case in FIG. 9 described previously in that the position of the white line object is shifted slightly in the rightward direction and the arrangement is such that the gap between the objects is not filled completely. FIG. 12 is a diagram corresponding to FIG. 9 described previously. In this case also, a portion 1201' to be painted black of a black rectangular object 1201 on one side and a portion 1202' to be painted black of a black rectangular object 1202 on the other side are drawn side by side and a portion 1203' to be painted white of a line object 1203 is drawn on the gap portion in an overwriting manner. However, as shown schematically, the portion 1203' is drawn so that a small gap remains here. In FIG. 12 the portion 1203' to be painted white is represented by shading so that it is easy to recognize that the portion is drawn in the state where a small gap is left.

Figure 13A:
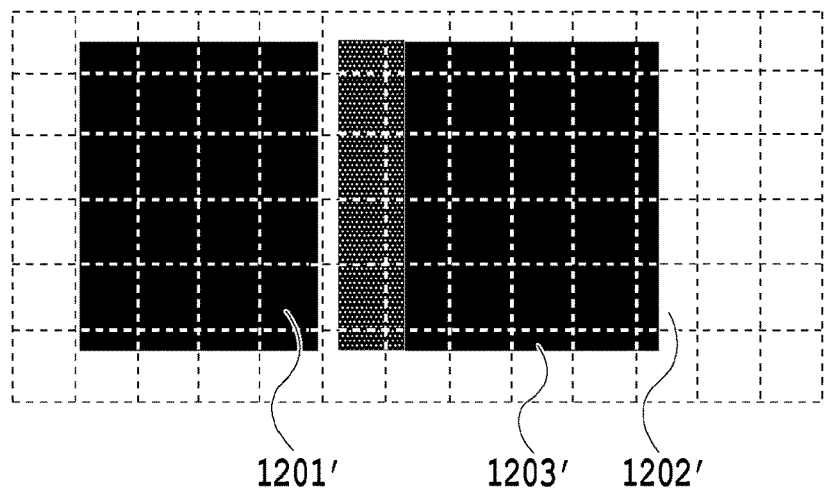
FIG. 13A is a diagram showing results of drawing PDL data in theoretical coordinates of an application with physical coordinates being overlapped.
Figure 13B:
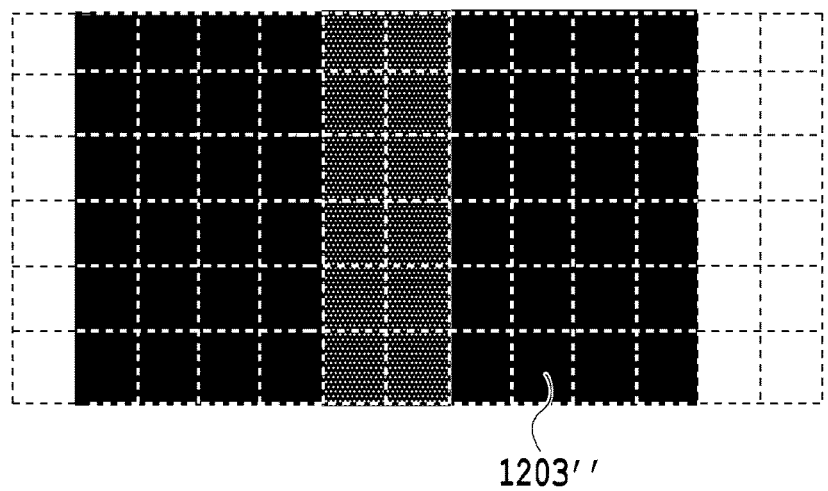
FIG. 13B is a diagram showing an example of an image in physical coordinates after conversion in a case where PDL type is PS.

FIG. 13A is a diagram showing the results of drawing the above-described PDL data in the theoretical coordinates of the application with physical coordinates being overlapped and the minimum unit square enclosed by a dotted line represents one pixel in the physical coordinates. According to the PS or PDF fill-rule, in a case where the pixel configuring the drawing object overlaps the physical coordinates even a little, the pixel is painted. Because of this, it is basically unlikely that a gap not intended occurs between the objects. For example, an image in the physical coordinates after conversion of the above-described PDL data is normally as shown in FIG. 13B. That is, a shaded portion 1203" corresponding to the line object 1203 for which stroke of one-pixel width is specified widens so as to have a two-pixel width in the physical coordinates.

Figure 13C:
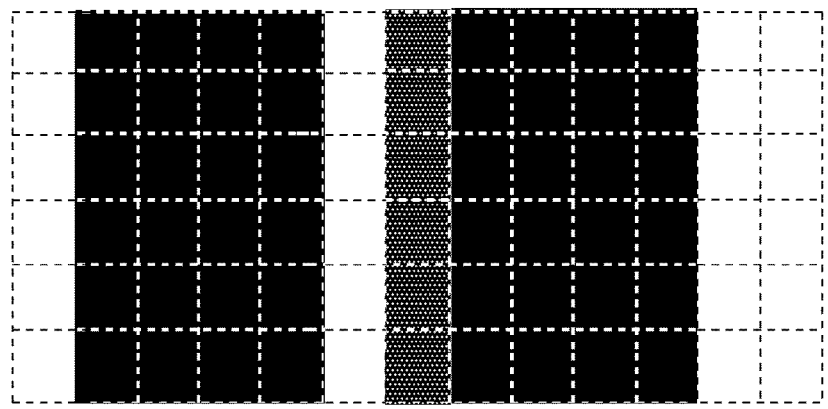
FIG. 13C is a diagram showing an example of an image after conversion into physical coordinates in a case where a line width adjustment function is applied.

However, PS and PDF have a function to correct the width of a Line attribute object, called "Stroke Adjust". This is a function to adjust the line width to the thickness of a line for which stroke is specified also in the physical coordinates after conversion. An image after the conversion into the physical coordinates in a case where the line width adjustment function is applied is shown in FIG. 13C. In FIG. 13C, the shaded portion corresponding to the line object 1203 has a one-pixel width, but it is known that a gap having a one-pixel width occurs simultaneously. In this case, the gap widens and such a result is not what a user desires, and therefore, it is desirable to be capable of suppressing the gap from widening.

(White Thin Line Correction Processing)

Figure 14:
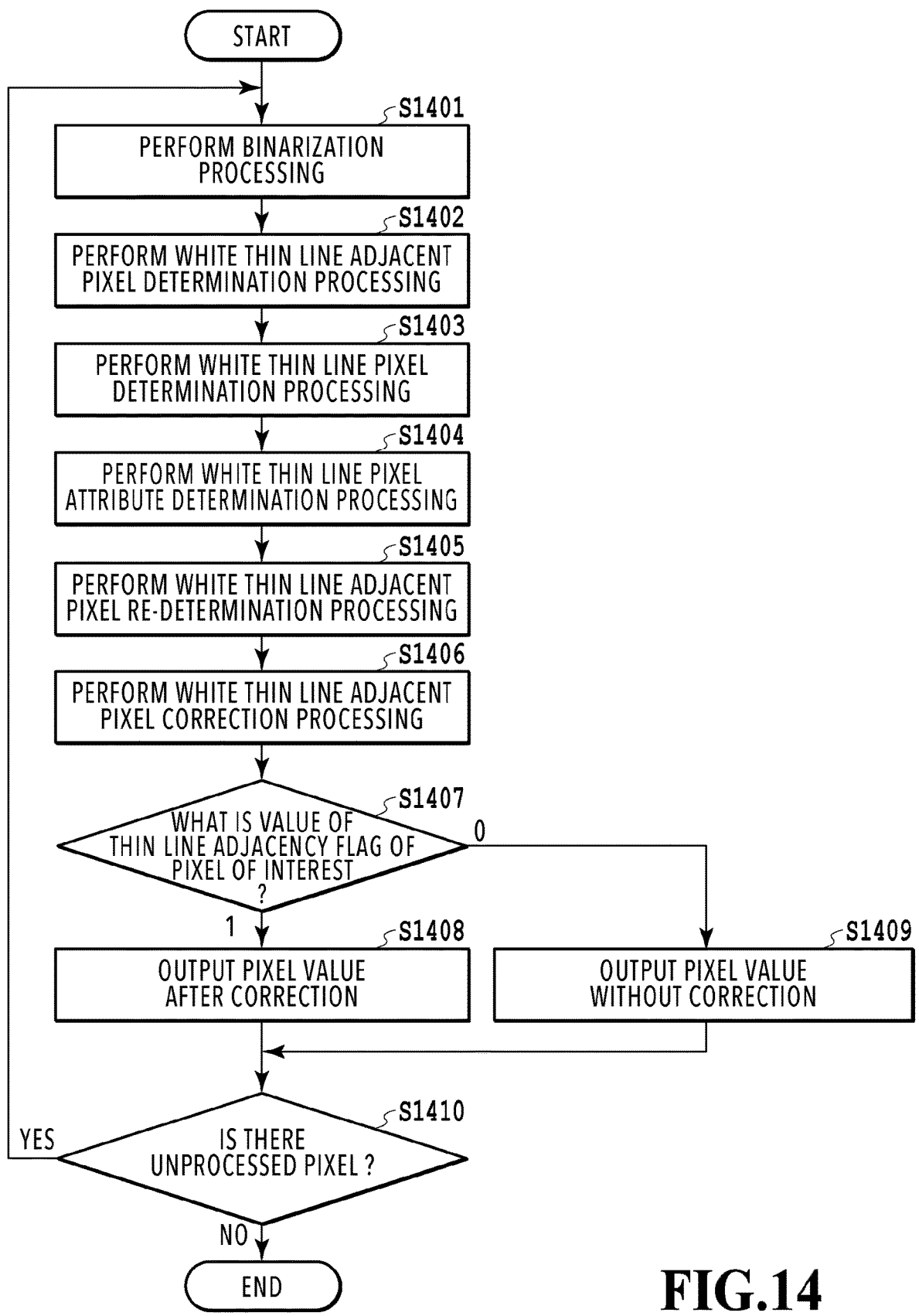
FIG. 14 is a flowchart showing a flow of thickening processing according to the first embodiment.

Next, white thin line correction processing (thickening processing), which is a feature of the present embodiment, performed by the white thin line correction unit 202 is explained in detail along the flowchart in FIG. 14. Here, explanation is given by taking processing for the K plane of the input CMYK data as an example. Then, it is assumed that the BMP data of the K plane (hereinafter, described as "K data"), which is the processing target, and the attribute data thereof are the rendering results shown in FIG. 8A-1 to FIG. 8B-2 and FIG. 11A and FIG. 11B described previously. Here, FIG. 15A-1 is the K data corresponding to FIG. 8A-1 described previously and FIG. 15A-2 is the attribute data corresponding to FIG. 8A-2 described previously. The portion of the black pixel in FIG. 8A-1 is represented by K=255 in FIG. 15A-1 and the portion of the white pixel in FIG. 8A-1 is represented by K=0 in FIG. 15A-1. For convenience of explanation, in FIG. 15A-1 and FIG. 15A-2, a range somewhat larger than that in FIG. 8A-1 and FIG. 8A-2 is shown schematically. Similarly, FIG. 15B-1 is the K data corresponding to FIG. 8B-1 described previously and FIG. 15B-2 is the attribute data corresponding to FIG. 8B-2 described previously. Further, FIG. 15C-1 is the K data corresponding to FIG. 11A-1 described previously and FIG. 15C-2 is the attribute data corresponding to FIG. 11A-2 described previously.

Figures 16A-1, 16A-2, 16B-1, 16B-2, 16C-1, 16C-2:
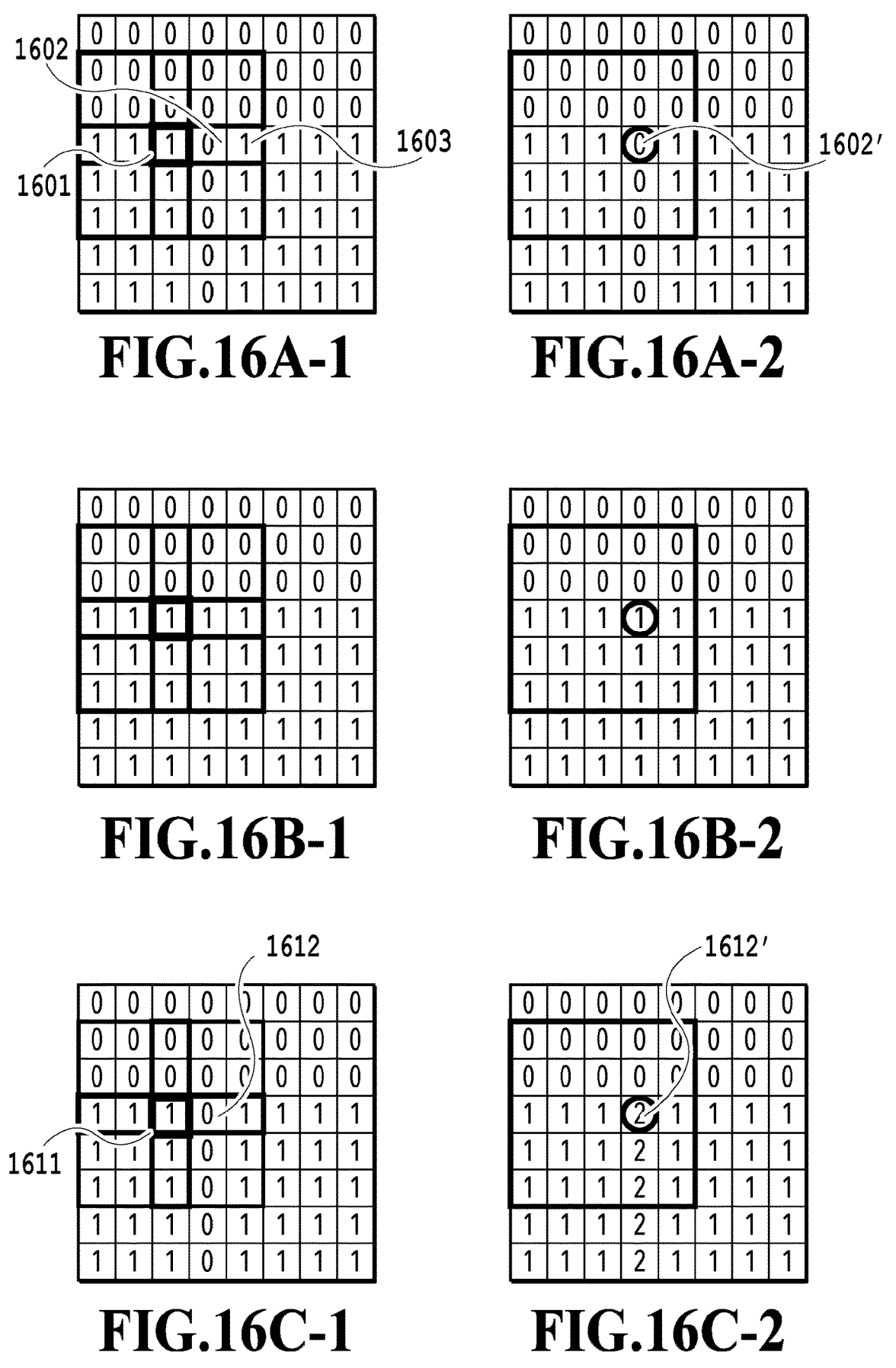

At S1401, the binarization unit 211 generates binary image data by performing binarization processing for a window image of a predetermined size (for example, 5×5 pixels) with the pixel of interest within the input K data as a center as the preprocessing for performing next adjacent pixel determination processing (S1402). Specifically, the binarization unit 211 performs simple binarization processing to compare a threshold value (for example, "5") set in advance, which corresponding to a predetermined density whose density value is substantially equal to "0", with each pixel value (density value) of the window image. In this case, on a condition that the pixel value is "0", "0" is output and on a condition that the pixel value is "255", "1" is output. For each piece of the K data in FIG. 15A-1 to FIG. 15C-1 described previously, by the binarization processing, binary image data whose pixel value is represented by "1" and "0" as shown in FIG. 16A-1 to FIG. 16C-1 is obtained. In this manner, the area whose density is less than or equal to the predetermined density included in the printing-target image is specified. FIG. 16A-2 to FIG. 16C-2 are attribute data corresponding to FIG. 16A-1 to FIG. 16C-1, respectively. The binarization processing is not limited to the simple binarization processing in which the threshold value is fixed. For example, it may also be possible to use the difference in the density value between the pixel of interest and the peripheral pixel as a threshold value to be applied. The data of the window image after the binarization processing is output to the adjacent pixel determination unit 212.

Next, at S1402, the adjacent pixel determination unit 212 determines whether or not the pixel of interest corresponds to the pixel (white thin line adjacent pixel) adjacent to the white thin line pixel by using the window image after the binarization processing and sets a flag (hereinafter, called "thin line adjacency flag") in accordance with determination results. First, white thin line adjacent pixel determination processing is explained.

Whether or not the pixel of interest corresponds to the white thin line adjacent pixel is determined by the matching processing as follows. Specifically, based on the pixel values of the pixel of interest and the peripheral pixels thereof, which of each pattern shown in FIG. 17A to FIG. 17D the pixel values match is checked and the pixel adjacent to the thin line having a one-pixel width is detected. FIG. 17E shows the pixel position of each pixel within the window image in the matching processing. Then, in each pattern in FIG. 17A to FIG. 17D, the three pixels within the thick frame are the pixels for which matching is performed. The pixel without slashes indicates the white thin line pixel having a pixel value of "0" and the pixel with slashes indicates the white thin line adjacent pixel having a pixel value of "1". For example, the pattern in FIG. 17A is a pattern in which the position of the pixel of interest is p22 and the pixel value at the position is "1", the pixel value at the position one pixel to the left (pixel position p21) is "0", and the pixel value at the position further one pixel to the left (pixel position p20) is "1". In the pattern in FIG. 17A, in a case where the position of the white thin line pixel is p21, the pixels located at the positions p20 and p21 on both sides thereof are the white thin line adjacent pixels. Similarly, the pattern in which the position of the pixel of interest is p22 and the pixel value at the position is "1", the pixel value at the position one pixel to the right (pixel position p23) is "0", and the pixel value at the position further one pixel to the right (pixel position p24) is "1" is the pattern in FIG. 17B. Similarly, the pattern in which the position of the pixel of interest is p22 and the pixel value at the position is "1", the pixel value at the position one pixel up (pixel position p12) is "0", and the pixel value at the position further one pixel up (pixel position p02) is "1" is the pattern in FIG. 17C. Similarly, the pattern in which the position of the pixel of interest is p22 and the pixel value at the position is "1", the pixel value at the position one pixel down (pixel position p32) is "0", and the pixel value at the position further one pixel down (pixel position p42) is "1" is the pattern in FIG. 17D. In a case where the pixel values of the pixel of interest and the peripheral pixels thereof match one of these patterns in FIG. 17A to FIG. 17D, it is determined that the pixel of interest is the white thin line adjacent pixel (but, the determination results are provisional and may change by re-determination processing (S1405), to be described later). Then, the adjacent pixel determination unit 212 determines a pattern signal indicating the results of the matching processing. For example, the adjacent pixel determination unit 212 determines the pattern signal so that in a case where the pixel values match the pattern in FIG. 17A, the pattern signal is "1", in a case where they match the pattern in FIG. 17B, the signal is 2", in a case where they match the pattern in FIG. 17C, the signal is "3", and in a case where they match the pattern in FIG. 14D, the signal is "4". In a case where the pixel values do not match any pattern, "0" is set to the pattern signal. Further, in a case where the pixel of interest is determined to be the white thin line adjacent pixel, as the value of the thin line adjacency flag, "1" indicating acknowledgment is set and in a case where the pixel of interest is not determined to be the white thin line adjacent pixel, "0" indicating negative acknowledgment is set.

For example, in the binary image in FIG. 16A-1, it is assumed that a pixel 1601 is the pixel of interest. In this case, the pixel value of the pixel of interest is "1", the pixel value of a pixel 1602 one pixel to the right is "0", and the pixel value of a pixel 1603 further one pixel to the right is "1", and therefore, the pixel values match the pattern in FIG. 17B. Consequently, the pixel of 1601, which is the pixel of interest, is determined to be the white thin line adjacent pixel. Then, the pattern signal is "2" and the thin line adjacency flag whose flag value is "1" is set. On the other hand, in a case of the binary image in FIG. 16B-1, even though any pixel is taken to be the pixel of interest, the pixel values do not match any of the patterns in FIG. 17A to FIG. 17D. Consequently, no pixel exists that is determined to be the white thin line adjacent pixel and the pattern signal is "0" and the value of the thin line adjacency flag is "0" for each pixel. In contrast to this, in a case of the binary image in FIG. 16C-1, as in FIG. 16A-1, there are pixel values that match the pattern in FIG. 17B, and therefore, for the pixel of interest for which the pixel values match the pattern, the pattern signal is "2" and the value of the thin line adjacency flag is "1". Of the information thus set for the pixel of interest, the information on the thin line adjacency flag is sent to the adjacent pixel re-determination unit 215 and the information on the pattern signal indicating the results of the matching processing is sent to the thin line pixel determination unit 213. In the present embodiment, the pixel adjacent to a thin line having a one-pixel width is detected, but it is also possible to detect a pixel adjacent to a thin line whose width is less than or equal to a predetermined width, for example, such as a 2-pixel width, by changing the configuration of the pattern.

Next, at S1403, the thin line pixel determination unit 213 specifies the position of the white thin line pixel in a case where the pixel of interest is the white thin line adjacent pixel based on the pattern signal received from the adjacent pixel determination unit 212. The position of the white thin line pixel in each of the four patterns described above is p21 in a case where the pattern signal is "1", p23 in a case where the pattern signal is "2", p12 in a case where the pattern signal is "3", and p32 in a case where the pattern signal is "4" (see FIG. 17A to FIG. 17D). In a case where the pattern signal is "0", the white thin line pixel does not exist. For example, in the binary image in FIG. 16A-1, the pattern signal in a case where the pixel of interest is the pixel 1601 is "2", and therefore, the pixel 1602 at the position corresponding to the pixel position p23 is specified as the white thin line pixel. Further, in the binary image in FIG. 16B-1, the pattern signal is "0" for each pixel of interest, and therefore, it is determined that the white thin line pixel does not exist. Further, in the binary image in FIG. 16C-1, the pattern signal in a case where the pixel of interest is a pixel 1611 is "2", and therefore, a pixel 1612 at the position corresponding to the pixel position p23 is specified as the white thin line pixel. The position information on the white thin line pixel thus specified is sent to the attribute determination unit 214.

At S1404, the attribute determination unit 214 determines the attribute of the pixel determined to be the white thin line pixel based on the position information and the attribute data thereof and sets a flag (hereinafter, called "non-drawing flag") in accordance with the determination results. For example, in a case where the pixel of interest is the pixel 1601 in the binary image in FIG. 16A-1, the pixel 1602 is specified as the white thin line pixel. The attribute of the pixel 1602 is determined based on the attribute data in FIG. 16A-2. Here, in the attribute data in FIG. 16A-2, the attribute value of a pixel 1602' corresponding to the pixel 1602 is "0". The attribute value "0" indicates the pixel in the non-drawing area in which no drawing object exists, and therefore, "1" meaning acknowledgment is set as the value of the non-drawing flag. Similarly, in a case where the pixel of interest is the pixel 1611 in the binary image in FIG. 16C-1, the pixel 1612 is specified as the white thin line pixel. The attribute of the pixel 1612 is determined based on the attribute data in FIG. 16C-2. Here, in the attribute data in FIG. 16C-2, the attribute value of a pixel 1612' corresponding to the pixel 1612 is "2". The attribute value "2" indicates the pixel of the Line attribute drawing object, and therefore, as the value of the non-drawing flag, "0" meaning negative acknowledgment is set. In a case where no white thin line pixel is specified as in the binary image in FIG. 16B-2, the position information thereon is not input. Because of this, as the value of the non-drawing flag, "0" meaning negative acknowledgment is set.

Next, at S1405, the adjacent pixel re-determination unit 215 determines whether or not the pixel of interest determined to be the thin line adjacent pixel is the pixel adjacent to the thin line that should be thickened by performing density correction based on the non-drawing flag set at S1404. Specifically, the thin line adjacency flag is reviewed in accordance with the following criteria.

In a case where the thin line adjacency flag is "1" and the non-drawing flag is "1"

Because of the thin line (background) of the non-drawing object, the thin line adjacency flag is canceled in order to exclude the thin line from the correction target (flag value is changed to "0")

In a case where the thin line adjacency flag is "1" and the non-drawing flag is "0"

Because of the thin line of the drawing object, the thin line adjacency flag is maintained in order to include the thin line in the correction target (the flag value is unchanged and remains "1")

In a case where the thin line adjacency flag is "0"

Irrespective of the value of the non-drawing flag, the thin line adjacency flag is maintained (the flag value is unchanged and remains "0")

Summarizing the above, the pixel to which the thickening processing is applied because the thin line adjacency flag is "1" is only the pixel whose input thin line adjacency flag is "1" and whose non-drawing flag is "0". Then, only for the pixel whose thin line adjacency flag is "1" finally, the pixel value after correction whose density has been reduced is output at S1406 next. The information on the thin line adjacency flag after the review is sent to the pixel selection unit 217 and the halftone image selection unit 206.

Next, at S1406, the adjacent pixel correction unit 216 corrects the value of the pixel of interest in accordance with a predetermined thickening amount. This processing is implemented by reducing the density of the pixels on both sides of the white thin line pixel by an amount corresponding to the maximum value "255" of one pixel in a case where the thickening amount is taken to be, for example, an amount corresponding to one pixel, that is, by subtracting 255/2="128" from the pixel value of the white thin line adjacent pixel. Due to this, the apparent width of the white thin line increases. In the present embodiment, this is implemented by designing a configuration in which all the pixel values of the pixel of interests are corrected in advance and only for the pixel whose thin line adjacency flag is "1" in image selection processing, to be described later, the pixel value after the correction (after the density is reduced) is output.

Figures 18A-1, 18A-2, 18B-1, 18B-2, 18C-1, 18C-2:
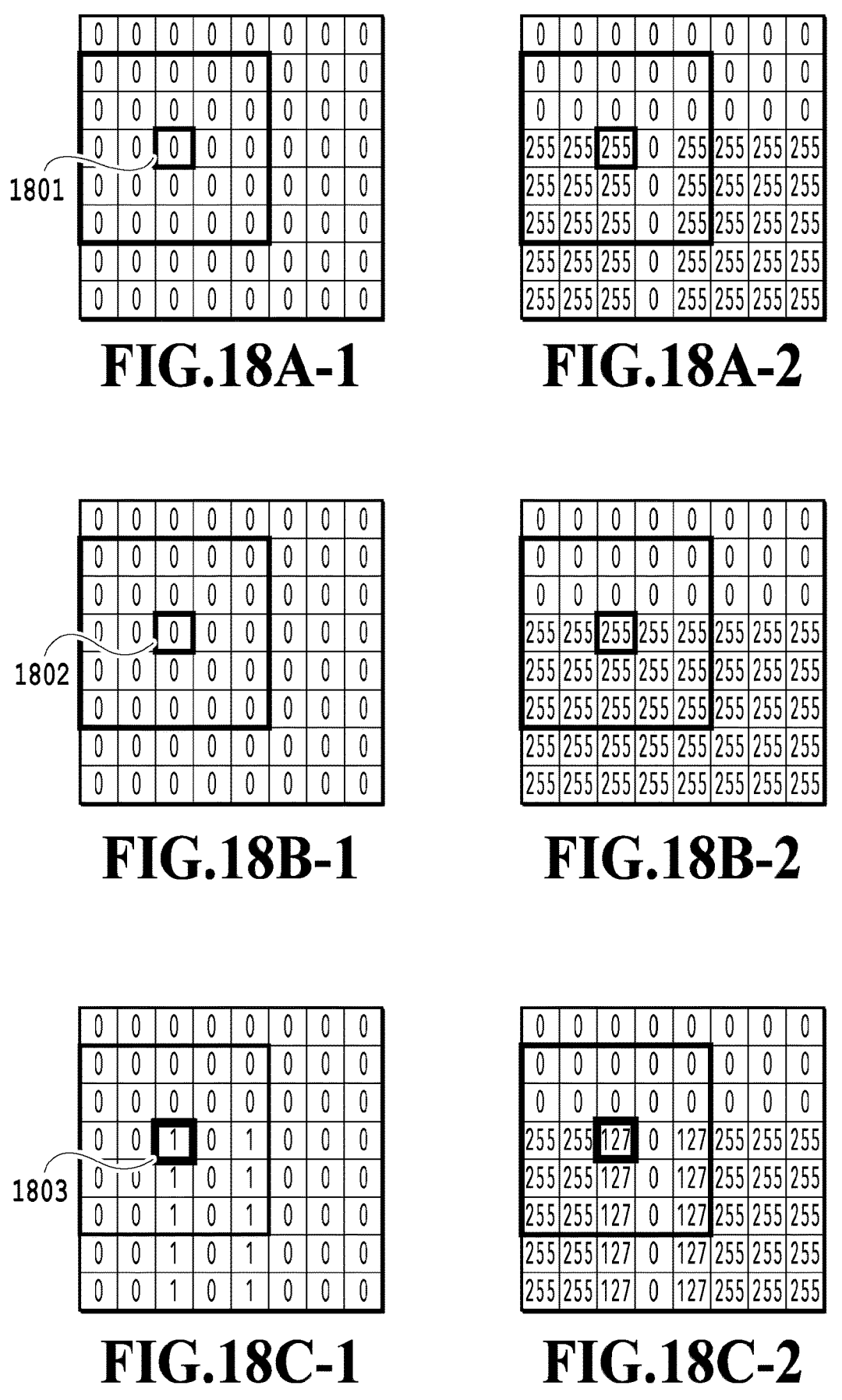

At S1407 to S1409, the pixel selection unit 217 selects whether to use the pixel value after correction or the pixel value before correction as the pixel value of the pixel of interest in accordance with the thin line adjacency flag set to the pixel of interest and outputs the selected pixel value to the gamma correction unit 203. That is, based on the value of the thin line adjacency flag, the processing is branched (S1407) and in a case where the flag value is "1", the pixel value after the density correction for the thickening processing is performed is output (S1408) and in a case where the flag value is "0", the pixel value without density correction is output (S1409). FIG. 18A-1 to FIG. 18C-1 each show the thin line adjacency flag after the re-determination processing described above, corresponding to each piece of the K data in FIG. 15A-1 to FIG. 15C-1. Then, FIG. 18A-2 to FIG. 18C-2 each show the pixel value selected by the pixel selection unit 217 in accordance with the thin line adjacency flag after the re-determination processing. For example, in a case where a pixel 1501 in the K data in FIG. 15A-1 is the pixel of interest, the value of the thin line adjacency flag of a corresponding pixel 1801 in FIG. 18A-1 is "0", and therefore, the pixel value "255" without correction is selected. Similarly, in a case where a pixel 1502 in the K data in FIG. 15B-1 is the pixel of interest, the value of the thin line adjacency flag of a corresponding pixel 1802 in FIG. 18B-1 is "0", and therefore, the pixel value "255" without correction is selected. Further, in a case where a pixel 1503 in the K data in FIG. 15C-1 is the pixel of interest, the value of the thin line adjacency flag of a corresponding pixel 1803 in FIG. 18C-1 is "1", and therefore, the pixel value "127" after correction is selected.

Figure 19A:
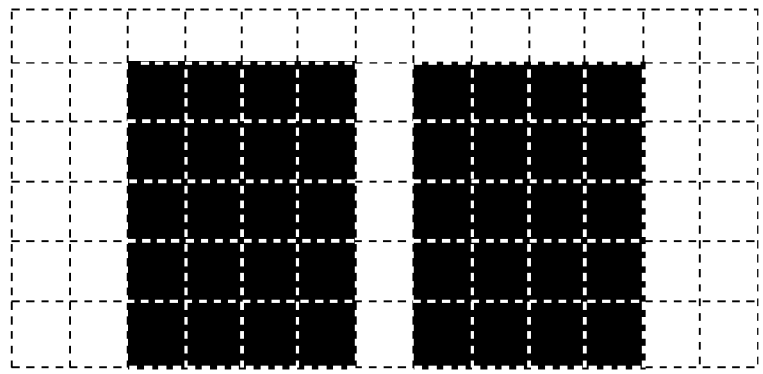
FIG. 19A to FIG. 19C are each a diagram showing an example of image data after the thickening processing of the first embodiment is completed.
Figure 19B:
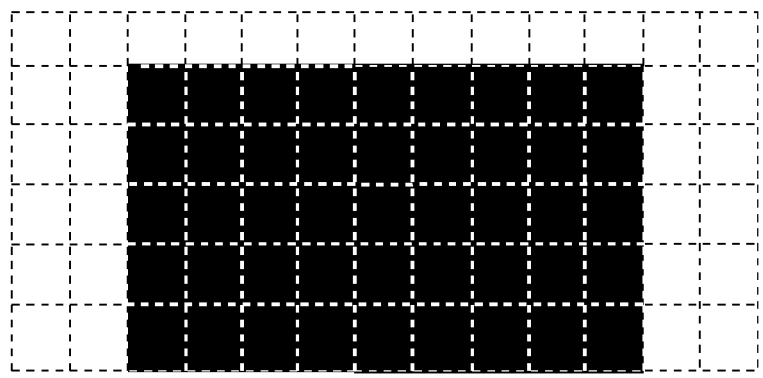
Figure 19C:
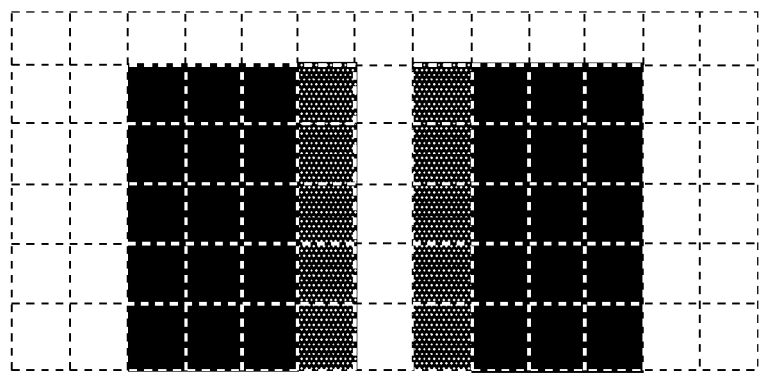

At S1410, whether or not the above-described processing is performed for all the pixels included in the buffer of the color conversion unit 201 is determined. In a case where there is an unprocessed pixel, the processing returns to S1401, and the next pixel is determined to be the pixel of interest and the processing is continued. On the other hand, in a case where the processing is completed for all the pixels, this flow is terminated. FIG. 19A to FIG. 19C each show the image data after this flow is terminated. FIG. 19A shows the processing results for the image after rendering shown in FIG. 8A-1. For the problem of the white gap, the width of the white thin line is maintained because the thickening processing is not applied and the gap that occurs unintentionally is prevented from widening. Further, FIG. 19B shows the processing results for the image after rendering shown in FIG. 8B-1. This is a case where no white gap exists originally and it is known that this case is not affected by this processing. FIG. 19C shows the processing results for the image after rendering shown in FIG. 11A. Because of the thin line that is formed by drawing a white line object, the thickening processing is applied and the width increases and it is possible to reproduce the white thin line more clearly.

The above is the contents of the thickening processing according to the present embodiment.

Modification Example

In the present embodiment, each pixel value of the processing-target image is corrected in advance in the adjacent pixel correction unit 216 (S1406) and the pixel value after correction is output only for the pixel whose thin line adjacency flag is "1" in the pixel selection unit 217 (Yes at S1407, S1408). However, the configuration is not limited to the configuration such as this. For example, it may also be possible to adopt a configuration in which the adjacent pixel correction unit 216 corrects the pixel value only for the pixel whose thin line adjacency flag is "1". In this case, it is possible to omit the pixel selection unit 217.

Figure 3B:
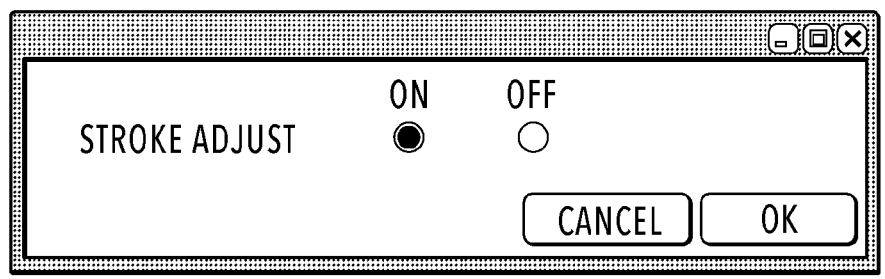

Further, there is a type of printer that enables a user to select whether or not to apply the line width adjustment function to the input PS or PDF PDL data, which is the function that works in a case where the PDL type is PS and PDF. FIG. 3B shows an example of a UI screen for a user to select ON/OFF of the line width adjustment function. It may also be possible to configure such a type of printer so that the control of the thickening processing described above is performed only in a case where the line width adjustment function is set to ON. Alternatively, it may also be possible to perform the control of the thickening processing described above only in a case where application of "Stroke Adjust" is specified in the PS or PDF PDL command.

As above, according to the present embodiment, in a case where the thin line within the image is a thin line whose density is zero (or equivalent thereto) of the non-drawing object, control is performed so that the thickening processing is not applied. Due to this, it is possible to prevent a white thin line not intended by a user from being thickened, which may occur at the time of performing rendering of PDL data.

Second Embodiment

In the first embodiment, only the pixel adjacent to a white thin line is taken as the density correction-target pixel in the thickening processing. Next, an aspect is explained as a second embodiment in which the pixel configuring a white thin line is also taken as the density correction target. Explanation of the contents in common to those of the first embodiment is omitted and in the following, processing of the white thin line correction unit, which is a different point, is explained.

Figure 20:
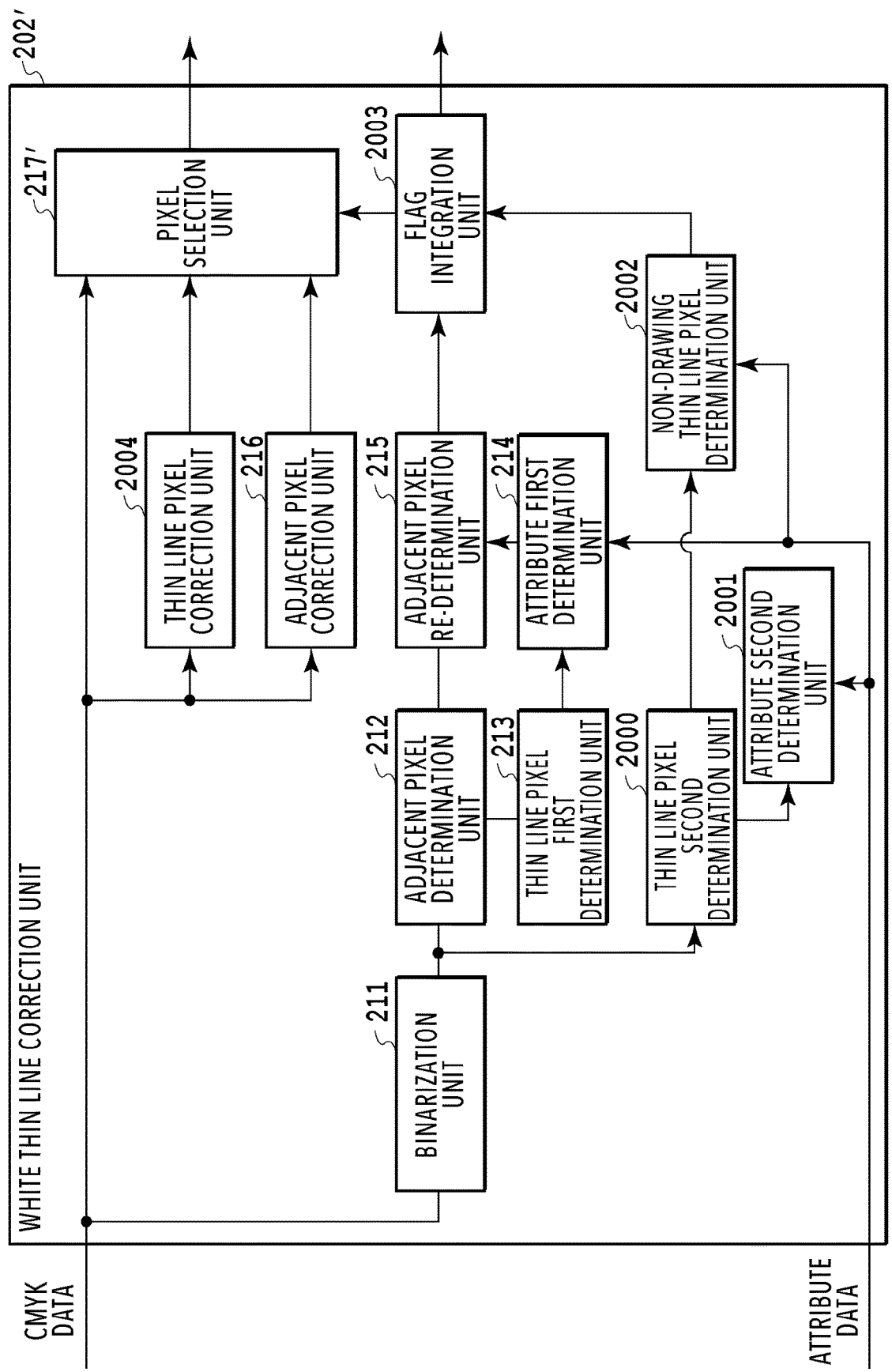
FIG. 20 is a detailed block diagram showing an internal configuration of a white thin line correction unit according to a second embodiment.
Figure 21:
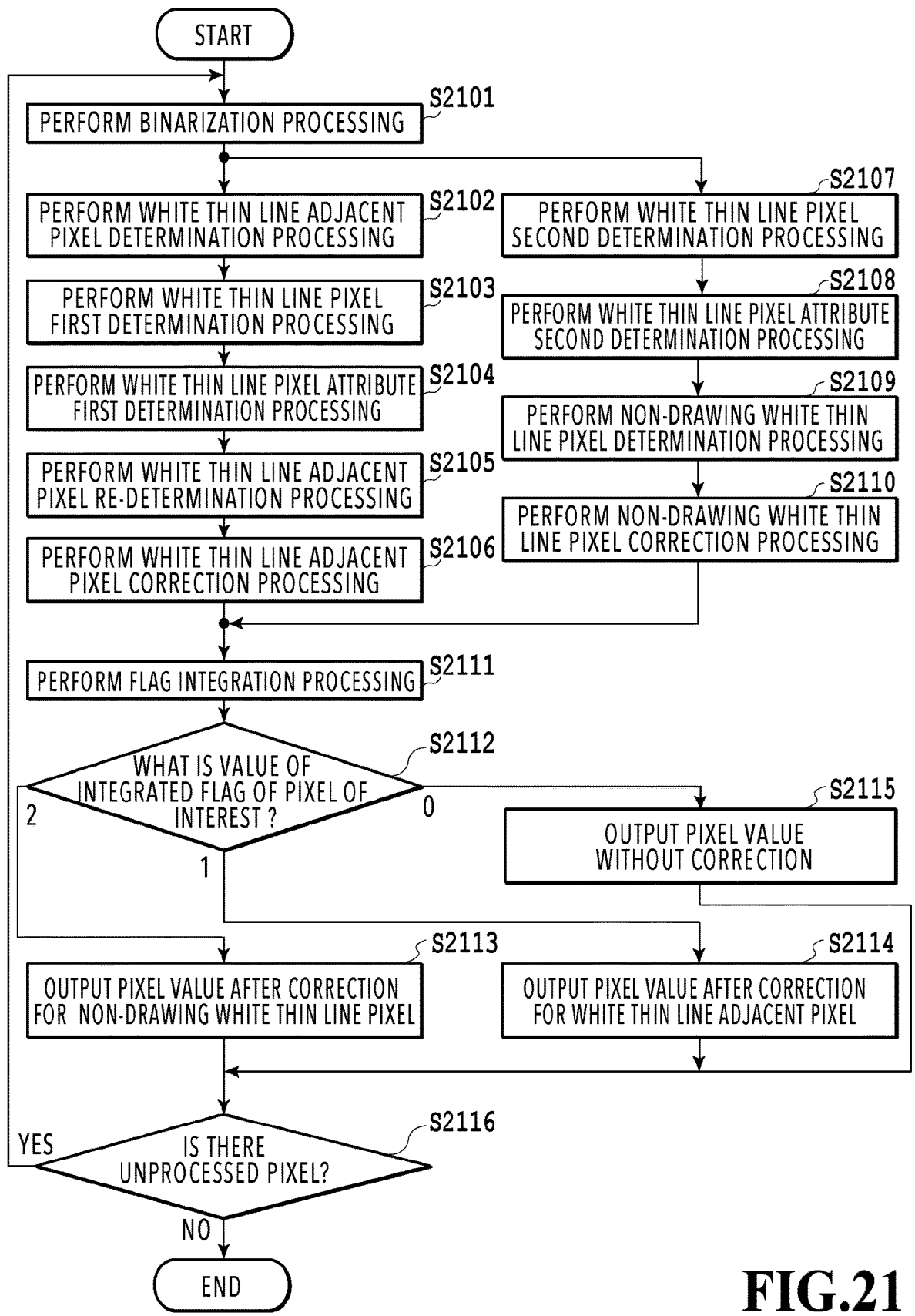
FIG. 21 is a flowchart showing a flow of thickening processing according to the second embodiment.

FIG. 20 is a detailed block diagram showing the internal configuration of a white thin line correction unit 202' according to the present embodiment. The white thin line correction unit 202' greatly differs from the white thin line correction unit 202 of the first embodiment in that a thin line pixel second determination unit 2000, an attribute second determination unit 2001, a non-drawing thin line pixel determination unit 2002, a flag integration unit 2003, and a thin line pixel correction unit 2004 are added. In the following, white thin line correction processing of the present embodiment is explained along the flowchart shown in FIG. 21.

S2101 to S2106 correspond to S1401 to S1406 respectively of the flow in FIG. 14 of the first embodiment. That is, each piece of processing by the binarization unit 211, the adjacent pixel determination unit 212, the thin line pixel determination unit 213, the attribute determination unit 214, the adjacent pixel re-determination unit 215, and the adjacent pixel correction unit 216 is performed. In the present embodiment, for convenience, the thin line pixel determination unit 213 is handled as "thin line pixel first determination unit" and the attribute determination unit 214 as "attribute first determination unit", but there are no differences from the first embodiment in terms of operations.

At S2107, the thin line pixel second determination unit 2000 determines whether or not the pixel of interest is a white thin line pixel by using the window image after binarization processing and sets a flag (hereinafter, called "white thin line flag") in accordance with determination results. First, white thin line pixel determination processing at this step is explained.

Figure 22A:
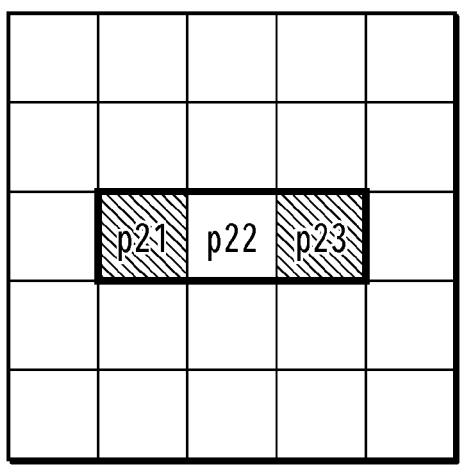
FIG. 22A and FIG. 22B are each a diagram showing an example of a pattern in matching processing.
Figure 22B:
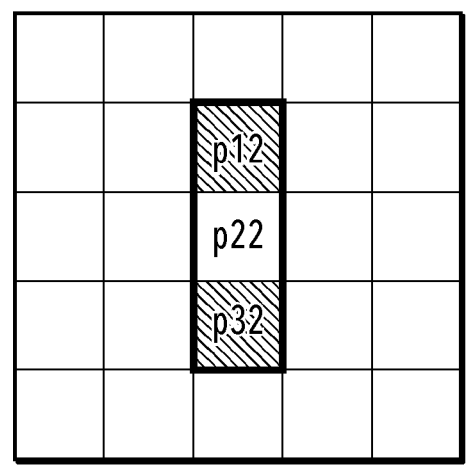

Whether or not the pixel of interest corresponds to a white thin line pixel is determined by matching processing as follows. Specifically, based on the pixel values of the pixel of interest and peripheral pixels thereof, which of patterns shown in FIG. 22A and FIG. 22B the pixel values match is checked. The pixel position of each pixel in the window image of 5×5 pixels at the time of the matching processing is the same as shown in FIG. 17E described previously. Then, in both the patterns in FIG. 22A and FIG. 22B, three pixels within the thick frame are pixels for which matching is performed, and the pixel without slashes indicates the white thin line pixel having a pixel value of "0" and the pixel with slashes indicates the white thin line adjacent pixel having a pixel value of "1". The pattern in FIG. 22A is a pattern in which the position of the pixel of interest is p22 and the pixel value at the position is "0" and the pixel values at both the position one pixel to the left and the position one pixel to the right (pixel positions p21 and p23) are "1". The pattern in FIG. 22A is a pattern in which in a case where the position of the white thin line pixel is p22, the pixels located at both the position p21 one pixel to the left and the position p23 one pixel to the right are the white thin line adjacent pixels. Similarly, the pattern in FIG. 22B is a pattern in which the position of the pixel of interest is p22 and the pixel value at the position is "0" and the pixel values at both the position one pixel up and the position one pixel down (pixel positions p12 and p32) are "1". The pattern in FIG. 22B is a pattern in which in a case where the position of the white thin line pixel is p22, the pixels located at both the position p12 one pixel up and the position p32 one pixel down are the white thin line adjacent pixels. In a case where the pixel values of the pixel of interest and the peripheral pixels thereof match one of both the patterns, the pixel of interest is determined to be the white thin line pixel. Then, in a case where it is determined that the pixel of interest is the white thin line pixel, to the pixel of interest, "1" meaning acknowledgment is set as the value of the white thin line flag. On the other hand, in a case where it is not determined that the pixel of interest is the white thin line pixel, "0" meaning negative acknowledgment is set as the value of the white thin line pixel.

Here, it is assumed that the binary images shown in FIG. 16A-1 to 16C-1 described previously and the attribute data shown in FIG. 16A-2 to FIG. 16C-2 are obtained by the binarization processing at S2101. For example, it is assumed that the pixel 1602 is the pixel of interest in a case of the binary image in FIG. 16A-1. At this time, the pixel value of the pixel of interest is "0" and the pixel values of the pixel 1601 and the pixel 1603 on both the sides thereof are "1", and therefore, the pixel values match the pattern in FIG. 22A. Because of this, the pixel 1602 that is the pixel of interest is determined to be the white thin line pixel. Then, the white thin line flag whose flag value is "1" is set. On the other hand, in a case of the binary image in FIG. 16B-1, the pixel values do not match any of the patterns in FIG. 22A and FIG. 22B even though any pixel is taken to be the pixel of interest. Consequently, in this case, no pixel is determined to be the white thin line pixel, and therefore, the white thin line flag whose flag value is "0" is set. In contrast to this, in a case of the binary image in FIG. 16C-1, as in FIG. 16A-1, there is a possibility that the pixels values match the pattern in FIG. 22A, and therefore, to the pixel of interest in a case where the pixel values match the pattern, the white thin line flag whose flag value is "1" is set. The information on the white thin line flag thus set is sent to the non-drawing thin line pixel determination unit 2002 and the position information on the pixel of interest determined to be the white thin line pixel is sent to the attribute second determination unit 2001.

Next, at S2108, the attribute second determination unit 2001 determines whether or not the pixel determined to be the white thin line pixel is a pixel in the non-drawing area based on the information on the position of the pixel of interest received from the thin line pixel second determination unit 2000. For example, in the attribute data in FIG. 16A-2, the value of the pixel 1602' is "0", and therefore, this indicates that the pixel is a pixel that is not drawn as an object. Consequently, in a case where the pixel 1602 is the pixel of interest in the binary image in FIG. 16A-1, "1" meaning acknowledgment is set as the value of the non-drawing flag thereof. On the other hand, in the attribute data in FIG. 16B-2, the pattern that matches in the matching processing at S2107 does not exist originally, and therefore, the position information does not exist and "0" is set as the value of the non-drawing flag. Further, in the attribute data in FIG. 16C-2, the value of the pixel 1612' is "2", and therefore, this indicates that the pixel is a pixel that belongs to the Line attribute object and which is drawn. Consequently, in a case where the pixel 1612 is the pixel of interest in the binary image in FIG. 16C-1, "0" meaning negative acknowledgment is set as the value of the non-drawing flag thereof.

Next, at S2109, the non-drawing thin line pixel determination unit 2002 determines whether the pixel of interest is a pixel that is not drawn and a pixel of a white thin line based on the white thin line flag set at S2107 and the non-drawing flag set at S2108. Then, the non-drawing thin line pixel determination unit 2002 sets a flag (hereinafter, called "non-drawing thin line flag") in accordance with determination results. Specifically, the non-drawing thin line flag is set in accordance with the following criteria.

In a case where the white thin line flag is "1" and the non-drawing flag is "1"

Because of the white thin line of the non-drawing object, "1" meaning acknowledgment is set as the value of the non-drawing thin line flag In a case where the white thin line flag is "1" and the non-drawing flag is "0"

Because of the white thin line of the drawing object, "0" meaning negative acknowledgment is set as the value of the non-drawing thin line flag In a case where the thin line flag is "0"

Irrespective of the value of the non-drawing flag, "0" meaning negative acknowledgment is set as the value of the non-drawing thin line flag Next, at S2110, the thin line pixel correction unit 2004 performs correction to increase the density of each pixel configuring the white thin line, which is the non-drawing object, and narrow the thin line area that is not drawn. Specifically, the average value of the density values of the pixels located on both the sides of the pixel of interest is found and the obtained average value is taken as a new pixel value of the pixel of interest. In addition, it may also be possible to take the pixel value of the pixel one pixel to the right or one pixel to the left of the pixel of interest as a new pixel value of the pixel of interest. What is required is that the pixel value has an effect to increase the density of the pixel of interest. In the present embodiment, the configuration is such that each pixel value of the processing-target image is corrected in advance and only for the pixel whose integrated flag, to be described later, is "2", the pixel value after the correction at this step is output. Next, at S2111, the flag integration unit 2003 sets a flag integrating both flags (hereinafter, called "integrated flag") based on the thin line adjacency flag (S2105) and the non-drawing thin line flag (S2109) to the pixel of interest. To this integrated flag, "2" is set in a case of the white thin line pixel that is not drawn, "1" is set in a case of the white thin line adjacent pixel, and "0" is set in a case of other pixels in accordance with the following criteria.

In a case where the thin line adjacency flag is "1"

Because of the white thin line adjacent pixel, the value of the integrated flag is set to "1" irrespective of the value of the non-drawing thin line flag In a case where the thin line adjacency flag is "0" and the non-drawing thin line flag is "1"

Because of the white thin line pixel that is not drawn, the value of the integrated flag is set to "2"

In a case where the thin line adjacency flag is "0" and the non-drawing thin line flag is "0"

Because of the pixel that does not need any correction, the value of the integrated flag is set to "0"

Next, at S2112 to S2115, a pixel selection unit 217' selects the pixel value in accordance with the integrated flag set to the pixel of interest and outputs to the gamma correction unit 203. That is, based on the value of the integrated flag, the processing is branched (S2112) and in a case where the flag value is "2", the pixel value after the correction at S2110 is output (S2113) and in a case where the flag value is "1", the pixel value after the correction at S2106 is output (S2114). Then, in a case where the flag value is "0", the pixel value without density correction is output (S2115). Then, along with the output of the pixel value, information on the integrated flag is output to the halftone image selection unit 206. FIG. 23A-1 to FIG. 23C-1 each show the integrated flag after the flag integration processing described above, corresponding to the K data in FIG. 15A-1 to FIG. 15C-1, respectively. Then, FIG. 23A-2 to FIG. 23C-2 each show the pixel value selected by the pixel selection unit 217' in accordance with the integrated flag after the flag integration processing. For example, in a case where a pixel 1504 in the K data in FIG. 15A-1 is the pixel of interest, the value of the integrated flag of a corresponding pixel 2301 in FIG. 23A-1 is "2", and therefore, the pixel value "255" after the correction by the thin line pixel correction unit 2004 is selected. Similarly, in a case where a pixel 1505 in the K data in FIG. 15B-1 is the pixel of interest, the value of the integrated flag of a corresponding pixel 2302 in FIG. 23B-1 is "0", and therefore, the pixel value "255" without correction is selected. Further, in a case where the pixel 1503 in the K data in FIG. 15C-1 is the pixel of interest, the value of the integrated flag of a corresponding pixel 2303 in FIG. 23C-1 is "1", and therefore, the pixel value "127" after the correction by the adjacent pixel correction unit 216 is selected.

Figure 24A:
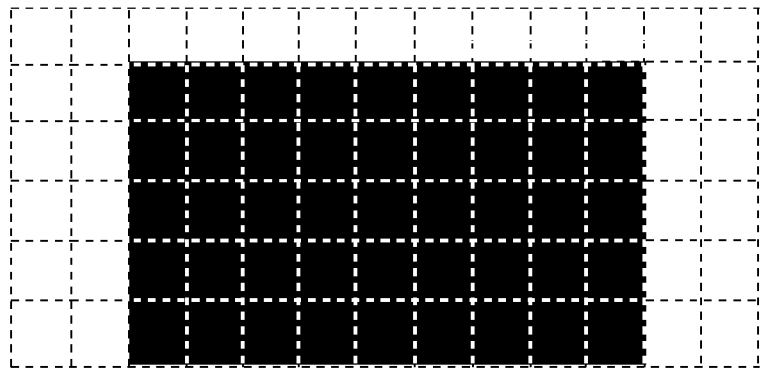
FIG. 24A to FIG. 24C are each a diagram showing an example of image data after the thickening processing of the second embodiment is completed.
Figure 24B:
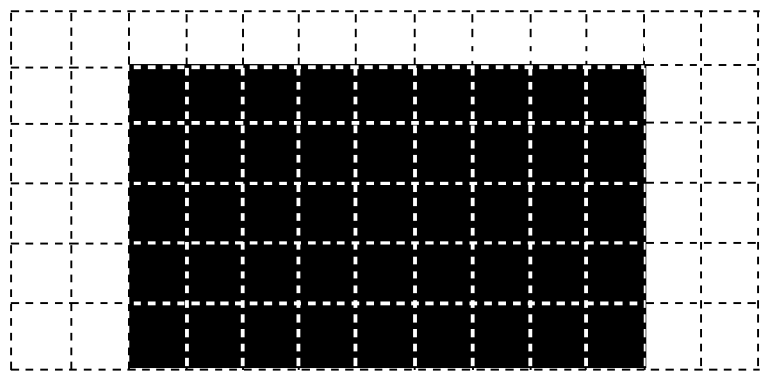
Figure 24C:
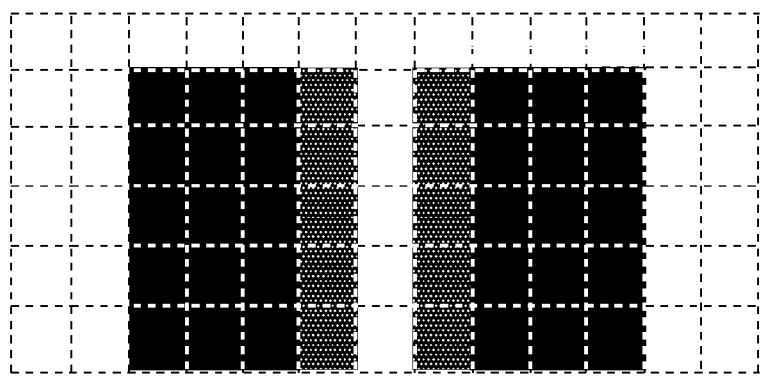

At S2116, whether or not the above-described processing is performed for all the pixels included in the buffer of the color conversion unit 201 is determined. In a case where there is an unprocessed pixel, the processing returns to S2101, and the next pixel is determined to be the pixel of interest and the processing is continued. On the other hand, in a case where the processing is completed for all the pixels, this flow is terminated. FIG. 24A to FIG. 24C each show image data after this flow is terminated. FIG. 24A shows the results of the processing for the image after rendering shown in FIG. 8A-1. For the problem of the white gap, the white gap is determined to be a white thin line pixel that is not drawn and processing to increase the density is applied, and therefore, the gap that occurred unintentionally has disappeared. Further, FIG. 24B shows the results of the processing for the image after rendering shown in FIG. 8B-1. This is a case where no white gap exists originally, and it is known that this case is not affected by this processing. FIG. 24C shows the results of the processing for the image after rendering shown in FIG. 11A. This is the thin line that is formed by drawing a white line object, and therefore, thickening processing is applied and the width increases and the white thin line is reproduced more clearly.

The above is the contents of the thickening processing according to the present embodiment.

In the present embodiment, the flag is provided for each piece of processing, but this is not limited and it may also be possible to use a flag corresponding to the results of a plurality of pieces of processing. For example, such a configuration may be accepted in which one kind of flag in which each flag value is associated with a pixel, such as "1" is associated with a white thin line adjacent pixel, "2" with a white thin line pixel that is not drawn, and "0" with other pixels, is used in common in a plurality of pieces of processing and in the integration processing, the value set to the flag is updated.

As above, according to the present embodiment, by performing correction to increase the density of a white thin line portion, which is a non-drawing object, it is possible to eliminate a gap that occurs on the contrary to the intention of a user, and therefore, it is made possible to further improve print quality.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in processing to thicken a white thin line, it is possible to control the application range thereof so as to prevent a white thin line not intended by a user from being thickened. Due to this, it is made possible to improve print quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-200061, filed Oct. 24, 2018 which is hereby incorporated by reference wherein in its entirety.

What is claimed is:

1. An information processing apparatus comprising:
one or more controllers, having one or more processors which execute instructions stored in one or more memories and/or one or more circuitries, being configured to perform thickening processing for a white line of image data to increase a width thereof, wherein the thickening processing is:
for processing of determining whether pixels forming a white line included in the image data are at least pixels of a first attribute indicating that an object is a drawing object generated based on a drawing command or pixels of a second attribute indicating that an object is not a drawing object generated based on a drawing command, and
increasing a width of a white line formed by the pixels of the first attribute and not increasing a width of a white line formed by the pixels of the second attribute.

2. The information processing apparatus according to claim 1, wherein
the one or more controllers are configured to further perform detection processing to detect the white line having a density less than or equal to a predetermined density from image data.

3. The information processing apparatus according to claim 2, wherein
the one or more controllers are configured to detect the white line having a width less than or equal to a predetermined width and having a density less than or equal to a predetermined density from image data in the detection processing.

4. The information processing apparatus according to claim 2, wherein
the one or more controllers are configured to detect the white line having a density less than or equal to the predetermined density by performing matching processing with a predetermined pattern in the detection processing.

5. The information processing apparatus according to claim 2, wherein
the one or more controllers are configured to:
perform generate processing to generate the image data by interpreting page description language (PDL) data; and
further perform, in a case where a white line width adjustment function that works for a predetermined PDL type is set valid in a PDL command included in the PDL data, the detection processing to detect the white line having a density less than or equal to the predetermined density.

6. The information processing apparatus according to claim 1, wherein
the one or more controllers are configured to:
receive a setting to set valid a mode of the thickening processing; and
perform the thickening processing for the white line in accordance with the setting.

7. The information processing apparatus according to claim 1, wherein
the one or more controllers are configured:
to receive a setting to set invalid a mode of the thickening processing; and
not to perform the thickening processing for the white line in accordance with the setting.

8. The information processing apparatus according to claim 1, wherein
the one or more controllers are configured to perform generation processing to generate image data by interpreting page description language (PDL) data.

9. The information processing apparatus according to claim 1, wherein
the one or more controllers are configured to perform:
generation processing to generate image data by interpreting page description language (PDL) data; and
the thickening processing, in a case where a white line width adjustment function that works for a predetermined PDL type is set valid in a PDL command included in the PDL data, for the white line that has a density less than or equal to a predetermined density and includes the pixels having attribute information of the drawing object.

10. The information processing apparatus according to claim 1, wherein
the one or more controllers are configured to:
perform generation processing to generate image data by interpreting page description language (PDL) data;
receive a setting whether to set valid a white line width adjustment function that works in a case where the PDL data is a predetermined PDL type; and perform, in a case where the white line width adjustment function is set valid in the setting, the thickening processing for the white line that has a density less than or equal to a predetermined density and includes the pixels having attribute information of the drawing object.

11. A control method of an information processing apparatus, the control method comprising:
performing thickening processing for a white line of image data to increase a width of the white line,
wherein the thickening processing is:
processing of determining whether pixels forming a white line included in the image data are at least pixels of a first attribute indicating that an object is a drawing object generated based on a drawing command or pixels of a second attribute indicating that an object is not a drawing object generated based on a drawing command, and
increasing a width of a white line formed by the pixels of the first attribute and not increasing a width of a white line formed by the pixels of the second attribute.

12. The control method according to claim 11, further comprising:
performing detection processing to detect the white line having a density less than or equal to a predetermined density from image data.

13. The control method according to claim 12, further comprising
detecting the white line having a width less than or equal to a predetermined width and having a density less than or equal to a predetermined density from image data in the detection processing.

14. The control method according to claim 12, further comprising:
detecting the white line having a density less than or equal to the predetermined density by performing matching processing with a predetermined pattern in the detection processing.

15. The control method according to claim 11, further comprising:
receiving a setting to set valid a mode of the thickening processing; and
performing the thickening processing for the white line in accordance with the setting.

16. The control method according to claim 11, further comprising:
receiving a setting to set invalid a mode of the thickening processing; and
not performing the thickening processing for the white line in accordance with the setting.

17. The control method according to claim 11, further comprising:
performing generation processing to generate image data by interpreting page description language (PDL) data.

18. The control method according to claim 11, further comprising:
performing generation processing to generate image data by interpreting page description language (PDL) data; and
performing the thickening processing, in a case where a white line width adjustment function that works for a predetermined PDL type is set valid in a PDL command included in the PDL data, for the white line that has a density less than or equal to a predetermined density and includes the pixels having attribute information of the drawing object.

19. The control method according to claim 11, further comprising:
performing generation processing to generate image data by interpreting page description language (PDL) data;
receiving a setting whether to set valid a white line width adjustment function that works in a case where the PDL data is a predetermined PDL type; and
performing, in a case where the white line width adjustment function is set valid in the setting, the thickening processing for the white line that has a density less than or equal to a predetermined density and includes the pixels having attribute information of the drawing object.

20. A non-transitory computer readable storage medium storing a computer program for causing a computer to execute a method of controlling an information processing apparatus, the method comprising:
performing thickening processing for a white line of image data to increase a width of the white line,
wherein the thickening processing is:
processing of determining whether pixels forming a white line included in the image data are at least pixels of a first attribute indicating that an object is a drawing object generated based on a drawing command or pixels a second attribute indicating that an object is not a drawing object generated based on a drawing command, and
increasing a width of a white line formed by the pixels of the first attribute and not increasing a width of a white line formed by the pixels of the second attribute.

* * * * *